(12) United States Patent
Kremerman

(10) Patent No.: US 11,111,924 B2
(45) Date of Patent: Sep. 7, 2021

(54) MAGNETIC SPINNER DEVICE WITH REELS IN A LOWER HOUSING WITH A REMOVABLY ATTACHABLE LOWER PORTION

(71) Applicant: Elliot Kremerman, Los Gatos, CA (US)

(72) Inventor: Elliot Kremerman, Los Gatos, CA (US)

( * ) Notice: Subject to any disclaimer, the term of this patent is extended or adjusted under 35 U.S.C. 154(b) by 0 days.

(21) Appl. No.: 17/197,161

(22) Filed: Mar. 10, 2021

(65) Prior Publication Data

US 2021/0190074 A1    Jun. 24, 2021

Related U.S. Application Data

(63) Continuation-in-part of application No. 17/101,120, filed on Nov. 23, 2020.

(60) Provisional application No. 63/080,209, filed on Sep. 18, 2020.

(51) Int. Cl.
  *F04D 13/06* (2006.01)
  *H02K 49/10* (2006.01)

(52) U.S. Cl.
  CPC ....... *F04D 13/064* (2013.01); *F04D 13/0613* (2013.01); *H02K 49/108* (2013.01)

(58) Field of Classification Search
  CPC ...... H02K 49/108; H02K 7/16; H02K 49/104; F04D 13/064; B01F 13/0818; B04B 9/02; B01L 3/08; B01L 2400/043; B67D 2210/00144
  USPC ......................................... 366/601
  See application file for complete search history.

(56) References Cited

U.S. PATENT DOCUMENTS 9,149,155 B2 * 10/2015 Vidal .................. B01F 13/0827
9,237,829 B2 *  1/2016 Vidal .................. B01F 13/0872

* cited by examiner

*Primary Examiner* — Elizabeth Insler
(74) *Attorney, Agent, or Firm* — Michael J. Feigin, Esq.; Feigin and Fridman LLC

(57) ABSTRACT

A magnetic spinner device using an impeller system to disperse heat and stir contents there-above is disclosed herein. A motor turning the impeller is offset from a center line extending vertically through the device. The impeller, however, is centered with fan blades pushing air downwards as heat rises from a heat source placed there-below, such as between legs which support the impeller and bowl of the device, the bowl being used to hold a flask and/or substances to be heated. The turning of the motor is translated to the turning of the impeller by way of two reels connected by a belt and placed within a lower housing with a removably connected lower portion. In this manner, the electric parts (the motor) and spared the brunt of the heat by being off-center while the heat rises upwards. The simplification of parts leaves less points of potential failure compared to the prior art as does the movement of electric parts away from being above a heat source.

17 Claims, 23 Drawing Sheets

MAGNETIC SPINNER DEVICE WITH REELS IN A LOWER HOUSING WITH A REMOVABLY ATTACHABLE LOWER PORTION

FIELD OF THE DISCLOSED TECHNOLOGY

The disclosed technology relates generally to distillation and, more specifically, to impeller systems.

BACKGROUND

Distillation or fractional distillation is carried out by heating a solid or liquid and removing gaseous vapors that are expelled therefrom. This is typically carried out by raising the temperature and boiling off fractions of the solid or liquid based on their differing boiling points. Separated compounds are removed from a distillation apparatus into an attached condenser in order to be converted from gas into a solid or liquid. Sometimes, however, the condensation process can be slow and/or less than precise when the solid or liquid is heated unevenly. The heating process may be made more effective by means of stirring, but this is an impractical solution for distillation on a large scale.

Therefore, there is therefore a need for a system which heats solids and/or liquids efficiently and evenly without requiring human intervention.

SUMMARY OF THE DISCLOSED TECHNOLOGY

An impeller system of embodiments of the disclosed technology has a first housing with a lower spindle. A portal within the first housing has a narrower middle section between two wider sections, and has a lower indented section within a raised border. The impeller system further has a first reel and a second reel rotatably connected to each other by way of a belt, with the lower spindle extending through a portal within said first reel. The first reel, second reel, and belt are in a second housing with a removably attached lower portion. In embodiments, the lower spindle extends from under the narrower middle section.

"Spindle" is defined as a device in a shape of a cylinder and/or in a shape of multiple cylinders stacked such that all of the cylinders have axis in a same direction, or as a device with a slender and round shaft which turns and/or on which something else turns. "Reel" is defined as a circular and/or elliptical, rotatable device around which a flexible device, such as a belt, is wound. "Belt" is defined as a continuous band of flexible material which transfers motion from one device, such as a reel, to another such device. "Removably attached/attachable" is defined as capable of being attached and detached at least 1000 times without becoming substantially significantly deformed.

The second reel, in some embodiments, is rotatably attached to a spindle of a motor, such that rotation of the spindle of the motor causes the first housing to rotate by way of the second reel, said belt, and said first reel. "Motor" is defined as a mechanical and/or electronic device which supplies motive power, such as by way of a turning spindle.

The second housing, in embodiments, is abutted against a spacer. The first housing, in some versions, is abutted against the spacer and is on an opposite side thereof relative to the second housing. In some embodiments, the spacer and the second housing are removably connected to each other so that both remain in place relative to one another when the first housing, which passes through the spacer, rotates.

"Spacer" is defined as a device which maintains a space of at least 0.1 milimeters between at least two other device.

The spacer, in various embodiments, has a central portal through which the spindle of the first housing extends, and further has four portals equi-spaced from the central portal. A distance from a central point of the central portal to a central point of a portal of said four portals may be substantially greater than a longest horizontal extent of the second housing.

The second housing, in various embodiments of the disclosed technology, further has a top side with a lip. The lip, in embodiments, forms a unitary structure with a floor having a first portal therein. A spindle of the motor is substantially centered with respect to the portal of the floor of the second housing. The lip, in various embodiments, further surrounds a second portal larger than said first portal. "Lip" is defined as a portion of a device, the portion having at least one flat portion and at least one curved portion, the portion further being functionally connected to a planar section with a length greater than a height of the portion.

"Circumference" is defined as "measure of a length of a circular or ovoid enclosing boundary of a named part of the device described herein".

Stated differently, an impeller system of embodiments of the disclosed technology has a first housing with a lower spindle and a second housing with a removably attached lower portion. A portal within the first housing has a narrower middle section between two wider sections, and a lower indented section within a raised border. A planar section of the removably attached lower portion of the second housing has a thickness substantially equal to a thickness of a functionally connected floor of the second housing. The lower portion of the second housing, when removably connected thereto, substantially abuts a sidewall of the second housing and the floor of the second housing. Thus, a space in a plane of the functionally connected floor of the second housing which is circumscribed by an edge of the floor and the sidewall of the second housing is substantially filled.

A bowl, in various embodiments, is centered above the first housing.

The first housing, in embodiments, is centered above a first reel. When the first reel is placed within the second housing and the lower portion thereof is removably connected thereto, the first reel is located vertically above a planer extent of the removable lower portion. Furthermore, when the first reel is placed within the second housing and the lower portion of the second housing is removably connected thereto, a second reel may be located vertically above a planer extent of the floor of the second housing. A spindle of a motor, in some embodiments, is substantially centered below the second reel.

In various embodiments of the disclosed technology, a part of a leg passes through each of four portals of a spacer located between the first housing and the second housing, each leg being elongated in a vertical direction. Four caps, in some embodiments, abut an upper side of the spacer and hold a respective leg to a lower side of the spacer. Each respective cap, in embodiments, has a respective spindle extending upwardly there-from.

Each said spindle, in some embodiments, is threaded. Each threaded spindle may be removably screwable into a respective hole on a lower side of the bowl.

In embodiments of the disclosed technology, the impeller also includes a plate and two magnets abutted there-against. The plate may be surrounded, at least in part, by the lower indented section of the first housing. The plate is, in embodiments, centered with regard to the first reel, and is vertically above the lower portion of the second housing.

The magnets, in some embodiments, are two rectangular prism shaped magnets abutted against the plate, each located within one of the two wider sections of the first housing. The two wider sections of the first housing may be in a shape of a rectangle, with a portal opening formed between flanges of the narrower middle section. In various embodiments, an arc corresponding to a circumference of the first reel passes through both wider section of the first housing.

In various embodiments, each of the two rectangular prisms has a side corresponding to a northern pole of a magnetic field thereof facing upwards towards the bowl and has a side corresponding to a southern pole of a magnetic field thereof facing in an opposite downward direction towards the second housing and the lower portion thereof. In other embodiments, each of the two rectangular prisms has a side corresponding to a southern pole of a magnetic field thereof facing upwards towards the bowl and a side corresponding to a northern pole of a magnetic field thereof facing in an opposite downward direction towards the second housing and the lower portion thereof. The plate is magnetized by the two rectangular prism shaped magnets.

In some embodiments, the motor is off-center with respect to the bowl, the first housing is centered with respect to the bowl, and the lower portion of the second housing is centered with respect to the first housing.

The first housing, in some embodiments, has fan blades which are closed to a top side of the first housing and open to a bottom side of the first housing. A diameter of the fan blades may be greater than a width of the lower portion of the second housing (the width being in a direction perpendicular to a longest extent of the second housing).

The impeller system may be adapted for placement of a heat source between the four legs. The heat source may be placed vertically above and horizontally offset relative to the motor, and vertically below the lower portion of the second housing. The heat source may further be substantially centered between the legs. Heat extending upwards from the heat source extends towards the fan blades and is thereby pushed downwards, causing a more even heating of the bowl while the two rectangular prism shaped magnets rotate with the fan blades.

A flask cover, in various embodiments, is adapted to cover a majority of a portion of the flask extending past an upper edge of the bowl. The flask cover may be constructed of an insulating material.

"Functionally connected" is defined as "being inseparable unless broken." "Abut", "abutted", and other such terms are defined as "sharing a common boundary there-with." "North pole" and "south pole", with regard to magnets, are defined as portions of a magnet which, when the magnet hangs freely, are attracted to/towards, respectively, the northern and southern magnetic poles of the globe.

For purposes of this disclosure, "top" refers to how the device is typically oriented relative to the ground. "Bottom" is towards the ground, how the device is typically used, e.g. with the legs towards and/or at the bottom and bowl towards and/or at the top.

"Vertical extent" is defined as "a portion which has a vertical length throughout which its cross-sections are substantially identical". "Horizontal extent" is defined as "a portion which has a horizontal length throughout which its cross-sections are substantially identical".

The directional descriptors used in this disclosure, such as "top", "bottom", "vertical", "horizontal", "upper", "lower", "above", and "below" are relative to a typical direction of use with a heat source below the portion of the vertically-extending passageway substantially farthest from a top portal of the apparatus.

Any device or step to a method described in this disclosure can comprise, or consist of, that which it is a part of, or the parts which make up the device or step. The term "and/or" is inclusive of the items which it joins linguistically and each item by itself. Any element or described portion of the devices shown can be "substantially" as such, if used in the claims in this manner. Where used, "substantially" is defined as "within a 5% tolerance level thereof."

DETAILED DESCRIPTION OF EMBODIMENTS OF THE DISCLOSED TECHNOLOGY

A magnetic spinner device using an impeller system to disperse heat and stir contents there-above is disclosed herein. A motor turning the impeller is offset from a center line extending vertically through the device. The impeller, however, is centered with fan blades pushing air downwards as heat rises from a heat source placed there-below, such as between legs which support the impeller and bowl of the device, the bowl being used to hold a flask and/or substances to be heated. The turning of the motor is translated to the turning of the impeller by way of two reels connected by a belt and placed within a lower housing with a removably connected lower portion. In this manner, the electric parts (the motor) and spared the brunt of the heat by being off-center while the heat rises upwards. The simplification of parts leaves less points of potential failure compared to the prior art as does the movement of electric parts away from being above a heat source.

Embodiments of the disclosed technology will become more clear in view of the following discussion of the figures.

Figure 1:
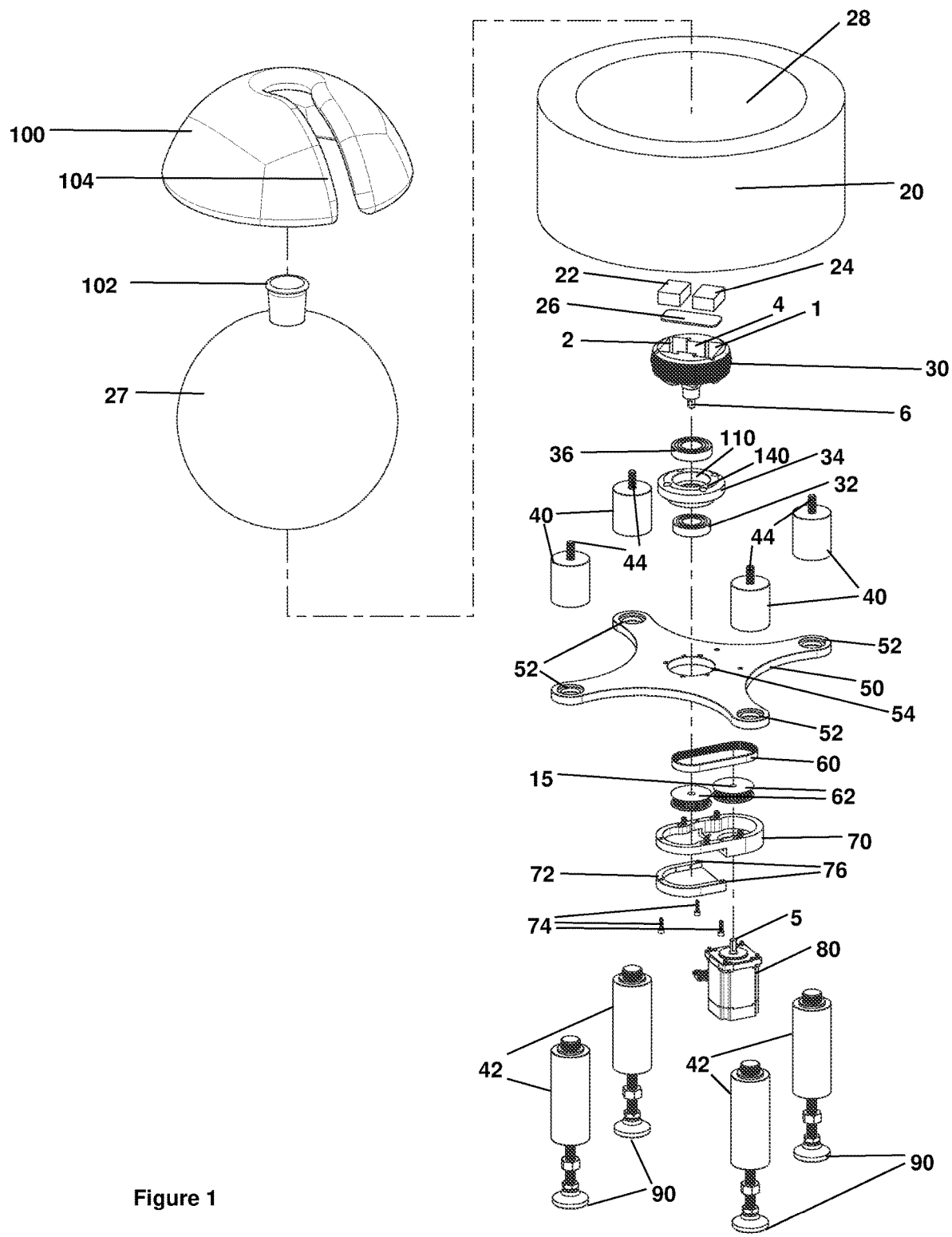
FIG. 1 shows a top and side exploded perspective view of a magnetic spinner system in an embodiment of the disclosed technology.
Figure 2:
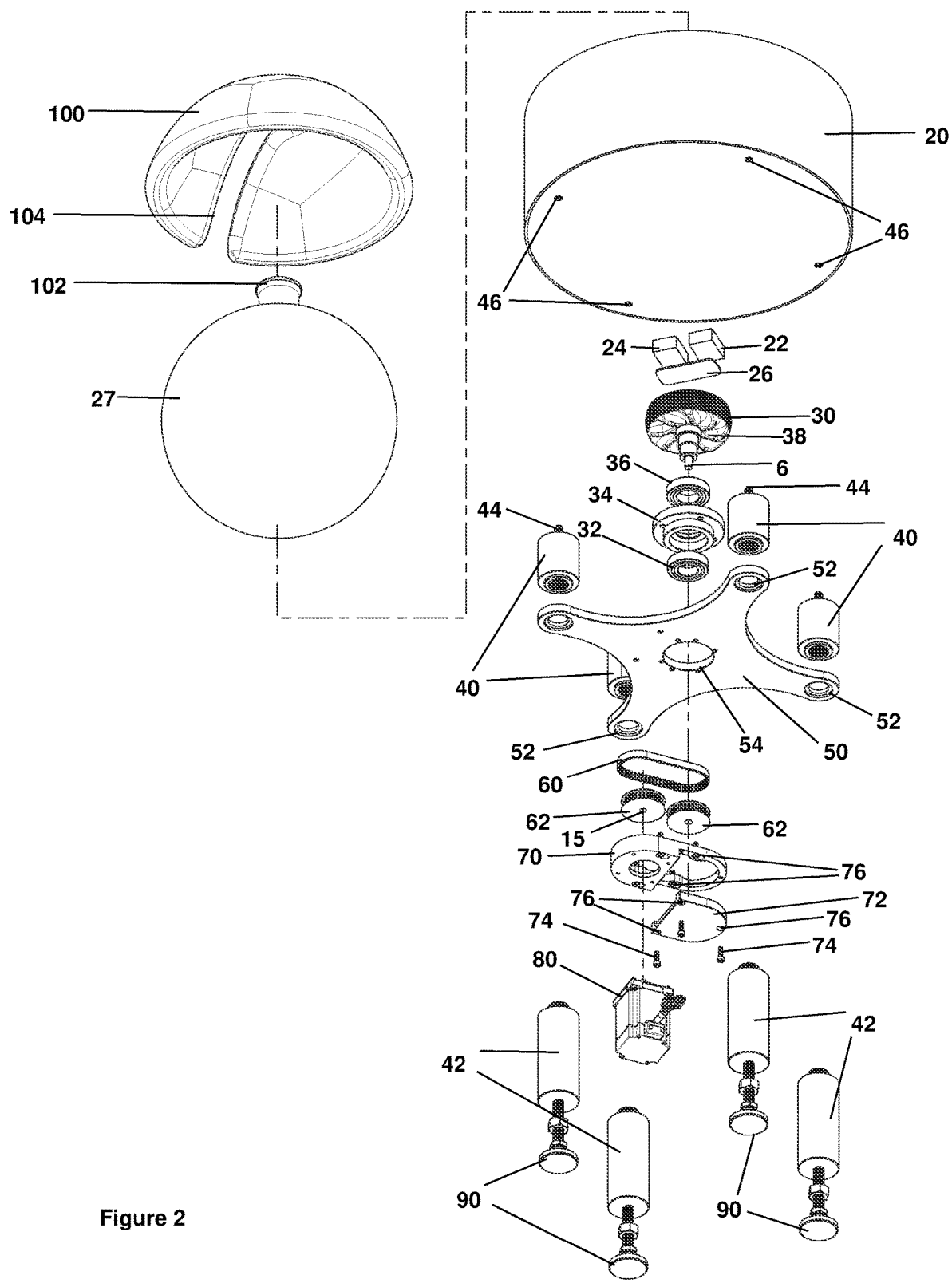
FIG. 2 shows a bottom and side exploded perspective view thereof.

Discussing FIGS. 1 and 2, FIG. 1 shows a top and side exploded perspective view of a magnetic spinner system in an embodiment of the disclosed technology. FIG. 2 shows a bottom and side exploded perspective view thereof. From bottom to top, feet 90 support support legs 42. The feet are adjustable height and in some embodiments, have a screw or elongated connector extending upwards through legs 42. The legs can fasten to the feet by rotatably connected to same. A spacer 50 attaches to and/or rests on the legs 42. The attachment mechanism, in one embodiment of the disclosed technology, are threaded caps 40 which thread onto the legs 42 such that the spacer 50 is between the caps 40 and legs 42. There can be three, four, five, or more legs with corresponding feet and portals 52 of the spacer 50. The portals 52 are where connector regions of the legs 42 pass through to connect to the caps 40.

Now discussing the spacer and elements attached thereto, a lower housing 70 is abutted and/or connected to and/or held against the spacer 50. The lower housing 70 can be held in place by way of at least one screw extending there-through and into a threaded portal within the spacer 50.

The lower housing is connected to a motor 80 whose business end (spindle 5 which rotates) extends through a lower portal (unnumbered) of the lower housing 70 and connects to a reel 62, which may be a type of washer or gear with teeth around the circumference. A belt 60 causes rotation of one of the reels to rotate the other reel. The reel situated directly over the motor 80 is off-center. When "center" is used in this disclosure, this refers to a vertical line which passes through the portal 54 of the spacer 50 and which is typically equidistant from the legs 42 and/or passes through the spindle 6 (lower elongated extent) of the top housing 30.

The off-center placement of the motor allows heat generated by a heat source below the device/parts shown in FIGS. 1 and 2 to rise without being blocked there-above by the motor. The heat generated also causes less harm or strain on the motor compared to a centrally-position motor, since the heat can extend upwards more centered than the motor rather than being directly under the motor.

Returning now to the lower housing, the lower housing 70 is held against a lower side of the spacer 50 by way of a plurality of screw 82, 84 extending through a plurality of holes 86, 88 therein. The top housing 30 has a lower spindle 6 which extends into a portal 15 in one of the reels 62. Washers 32, 34, and 36, which are above, within, and below the portal 54 of the spacer 50 (in some embodiments) reduce friction between the top housing 30 and the spacer 50, allowing the upper housing 30 to spin as the reels 62 spin. The upper housing 30 is centered at the spindle 6. The upper housing comprises a top portal which is discussed in more detail below.

The lower housing 70 further has a removably attached lower portion 72. The lower portion 72, in the embodiment shown, has a planar section surrounded on three sides by a lip, such that the lip forms a sidewall. The lower portion 72 may be attached to the lower housing 70 by way of a plurality of screw 74 and a plurality of holes 76 such that a bottommost edge of the planar section of the lower portion 72 forms a substantially flat, unbroken surface with a bottommost edge of a lowermost portion of the lower housing 70.

Within the top portal are wider sections 1 and 2 as well as a narrow section 4, the narrow section 4 being made narrower, in embodiments of the disclosed technology, by a flange extending into what would otherwise be a rectangular portal. A bottom side of the upper housing 30 has an indented region surrounded by, or mostly by, or partially by, a lip 3. The lip 3 can be of any size or shape and prevents rectangular prisms or other shaped upper magnets from falling into the indented region.

In the embodiment shown, two magnets 22 and 24, in shapes of rectangular prisms, are inserted within and/or sized to be inserted within the wider sections 1 and 2. The magnets 22 and 24 are spaced apart, leaving a space in the center of the upper housing allowing heat to rise there-above unhindered by the magnets at the center line/center area of the devices (e.g. a vertical line equidistant from the legs 42 and passing through a central point of the portal 52).

The magnets 22 and 24 are sized such that in at least one orientation, and in some embodiments, two orientations, and in some embodiments, three orientations each 90 degrees offset from one of the other orientations, the magnets are unable to rest flat within the indented region on the lip 3. A plate 26 fits within the indented region such that a most-elongated and second-most-elongated distance at right or perpendicular angles to each other are normal to the vertical center. The magnets 22 and 24 abut the plate 26, magnetizing the plate 26 such that a magnetic field extends across the plate 26. This magnetic field is stronger than the two magnets separately as it is joined into a single extended magnetic field, comparatively. It should be understood that any magnetic configuration can be used in other embodiments of the disclosed technology as long as the magnets are able to turn an impeller by way of magnetic force.

A bowl 20 is situated above the elements 1 to 4 and 28 to 90 in embodiments of the disclosed technology. The bowl can have a flask 27, glassware, or other device held therein along with a substance (solid, liquid, or combination thereof) to be heated and/or spun (stirred). The heat rising upwards can extend vertically with minimal blockage by parts between the bowl 20 and the heat source (not shown). These parts, in some embodiments, which are at the vertical center line are limited to, in some embodiments, the bowl 20, the plate 26 (which is made relatively thin and has a very low heat capacity), the upper housing 30, one of the reels 62, the lower housing 70, and the lower portion 72 of the lower housing 70. The motor 80 and magnets 22/24 are outside of the vertical center in such embodiments of the disclosed technology.

Referring now specifically to FIG. 2, fan blades 38 are shown which spin with the upper housing 30 causing air, in some embodiments, to be pushed downwards, causing a more even flow of upward air towards the bowl 20. The spindle 6 of the upper housing 30, in the embodiment shown, has multiple stacked portions, each in shapes of cylinders with different radii. An uppermost cylinder of the spindle 6, in the embodiment shown, has a larger radius than a portal of the washer 36, such that when the device is assembled, a space exists between an uppermost edge of the washer 36 and a lowermost edge of the fan blades 38 and/or a lowermost edge of the upper housing 30.

Figure 3:
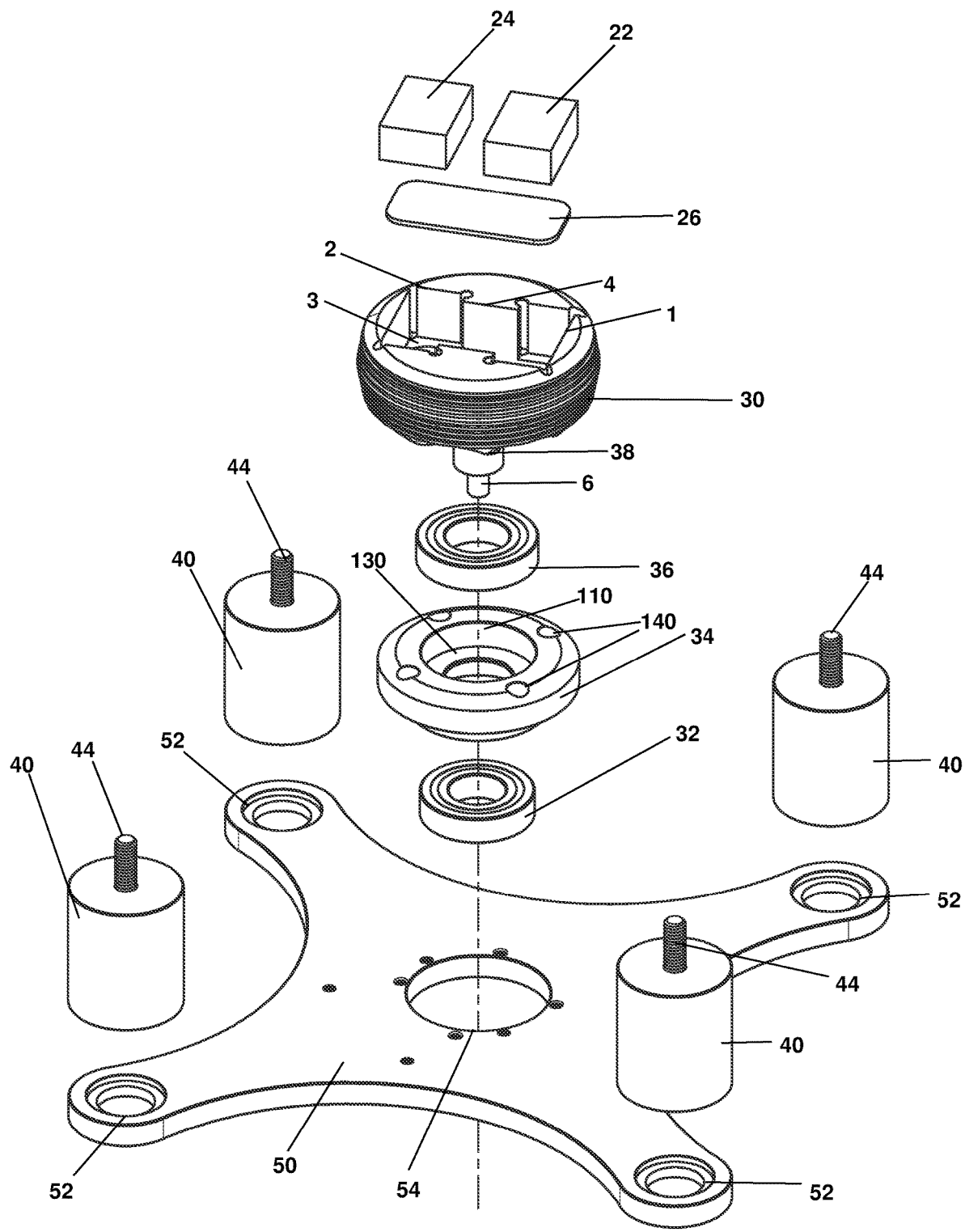
FIG. 3 shows a top and side exploded perspective view of a spacer, washers, top housing, plate, magnets, and caps thereof.
Figure 4:
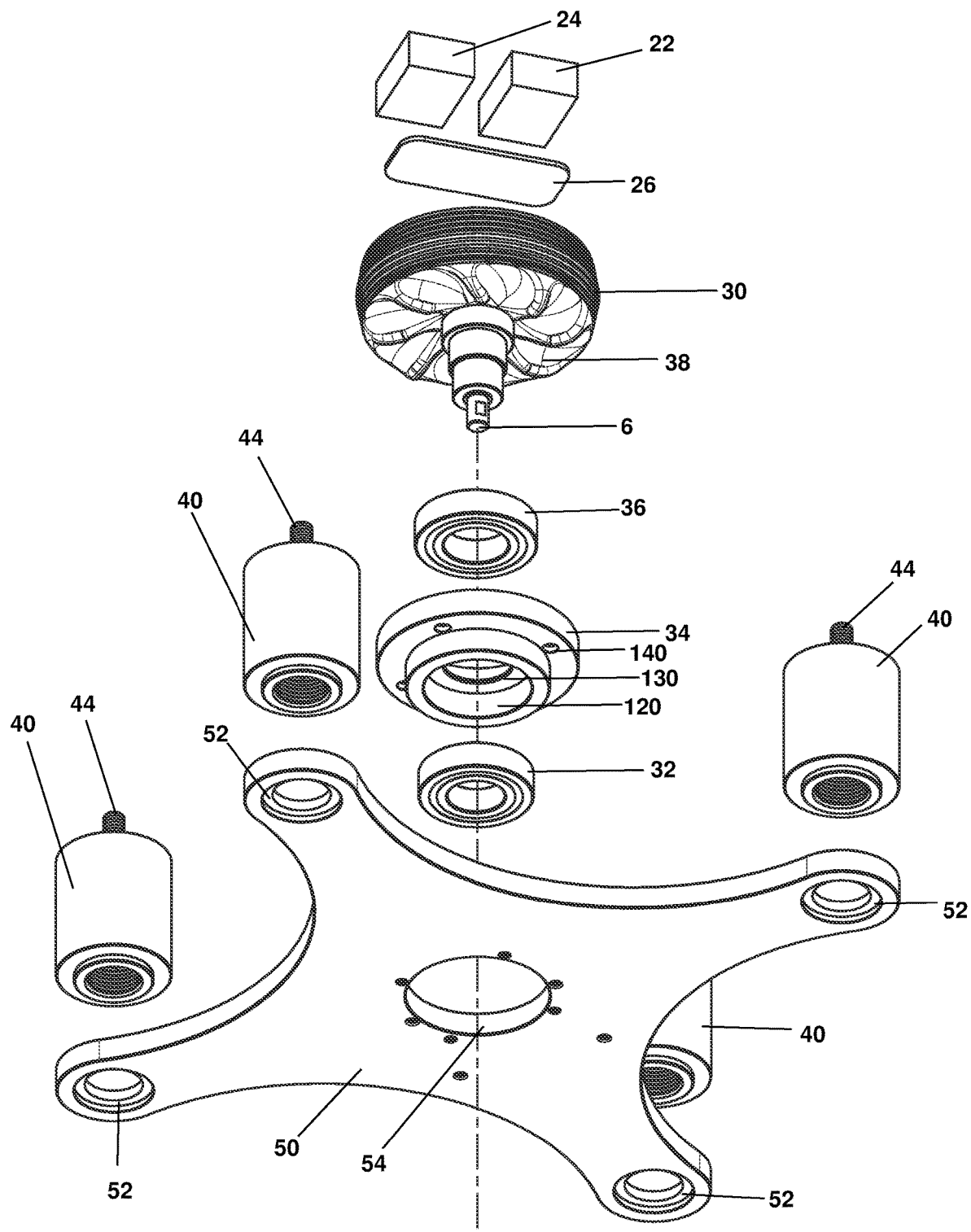
FIG. 4 shows a bottom and side exploded perspective view of a spacer, washers, top housing, plate, magnets, and caps thereof.

FIG. 3 shows a top and side exploded perspective view of a spacer, washers, top housing, plate, magnets, and caps thereof. FIG. 4 shows a bottom and side exploded perspective view of a spacer, washers, top housing, plate, magnets, and caps thereof. In the embodiment shown, each cap 40 has a threaded spindle 44 extending upwardly from a top-most planar surface thereof, such that when the device is assembled, each spindle 44 extends into a respective hole 46 within a bottom-most planar surface of the bowl 20. This system of matched spindles 44 and holes 46 holds the caps 40, and by extension the legs 42 and the spacer 50, substantially stationary with respect to rotational movement of the spindle 5 of the motor 80, such that the legs 42, caps 40, and spacer 50 substantially do not rotate with rotation of the spindle 5 of the motor 80. In other embodiments, this prevention of rotation may be accomplished by other similar systems, such as the use of spindles extending upwardly from an upper planar surface of the spacer 50 and/or a different number of spindles. The spindles may be unthreaded.

The upper housing 30 is connected to the spacer 50 by way of three washers 32, 34, 36. In the embodiment shown, the spacer 34 has an interior tubular section, at least a portion thereof surrounded by, and functionally connected to, a ring. The interior tubular section has an upper portion 110 and a lower portion 120, the two portions being separated from each other by way of a lip 130. The upper and lower interior portions 110, 120 are shaped to receive, respectively, the washer 32 and the washer 36 (which may be identical).

The upper housing 20 has a spindle 6 which passes through central portals within washers 32, 34, 36, and central portal 54 of the spacer 50. Portions of the spindle 6 are of a width and/or diameter which is larger than the central portal of the washer 36, such that a gap exists between a lowermost side of the upper housing 30 and an uppermost side of the washer 36. This gap allows movement of the upper housing 30, and fan blades 38 attached there-to, without necessarily causing other components, such as washers 32, 34, and 36, to move.

Figure 5:
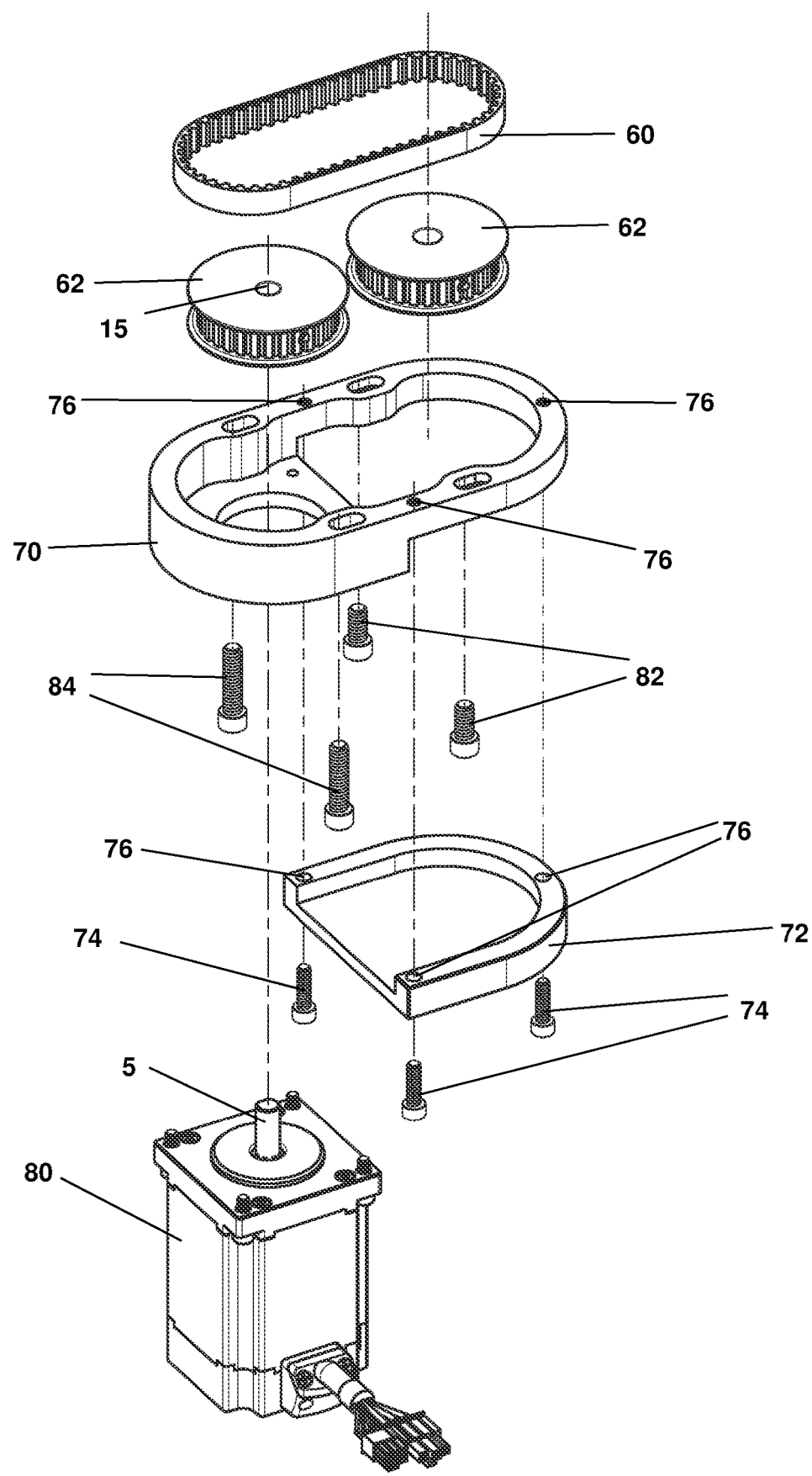
FIG. 5 shows a top and side exploded perspective view of a belt, reels, lower housing, screws, and motor thereof.
Figure 6:
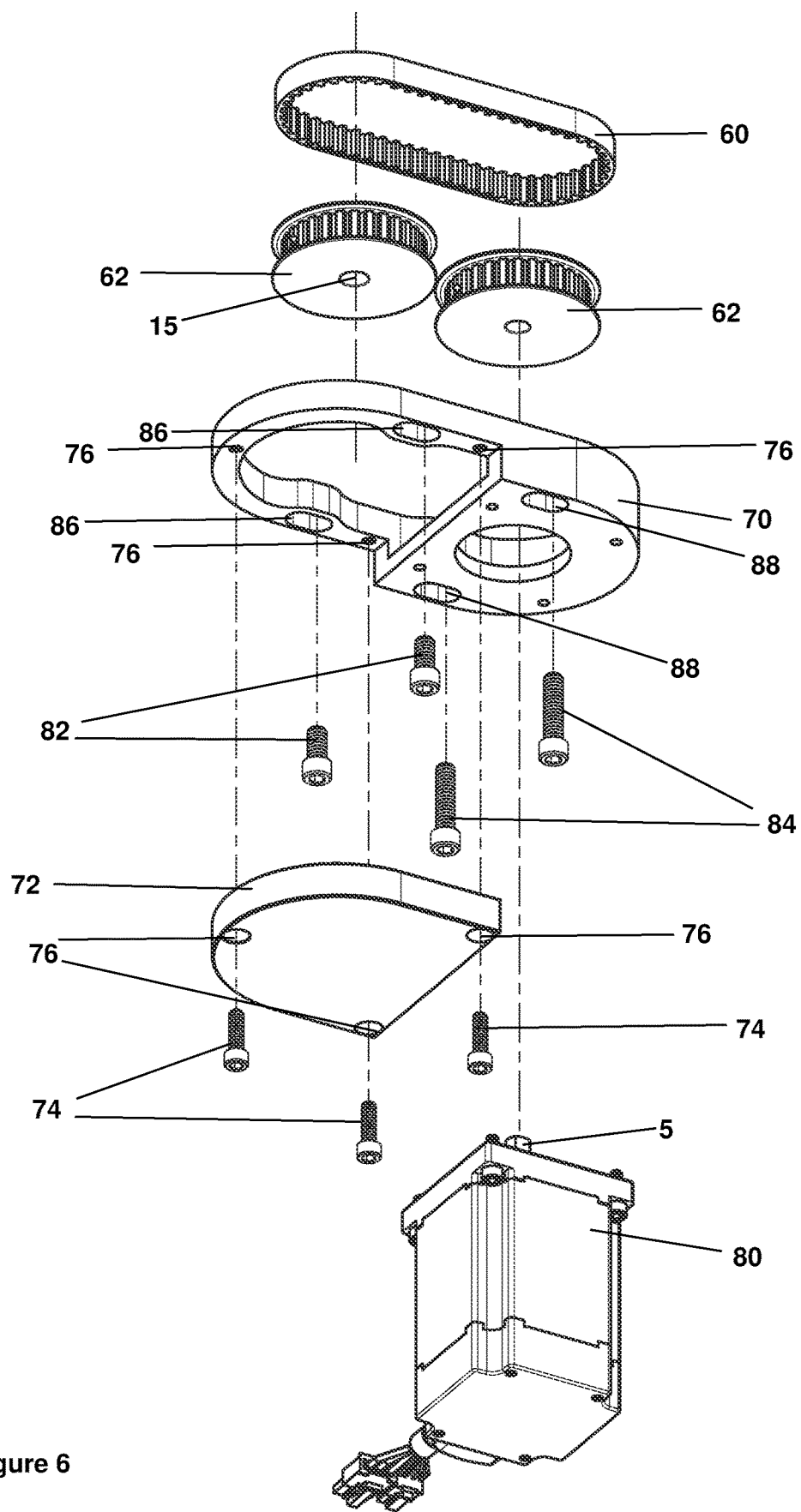
FIG. 6 shows a bottom and side exploded perspective view of a belt, reels, lower housing, screws, and motor thereof.

FIG. 5 shows a top and side exploded perspective view of a belt, reels, lower housing, screws, and motor thereof. FIG. 6 shows a bottom and side exploded perspective view of a belt, reels, lower housing, screws, and motor thereof. A lower housing 70 has sidewalls and a floor with portals therein. A lower portion 72 of the lower housing 70 has an extended planar section partially surrounded by a lip. An upper side of the lip and a side of the extended planar section not surrounded by the lip are shaped to abut, respectively, lower sides of a portion of the sidewall not functionally connected to the floor of the lower housing 70 and a planar side of the floor. Thus, when the lower housing 70 and the lower portion 72 are connected, the planar section of the lower portion 72 lies substantially flush against the floor of the lower housing 70.

The lower portion 72 is removably attachable to the lower housing 70. In the embodiment shown, this attachment is by way of screws 74 extending through threaded holes 76. In other embodiments, the attachment may be by way of other removable attachments. "Removable attachments" and "removably connected" are defined as attachments and/or connections which may be removed and reattached at least 1000 times without being broken and/or significantly deformed.

In the embodiment shown, when the lower portion 72 is removably connected to the lower housing 70, the joint component of the lower planar extent of the lower portion 72 and the floor of the lower housing 70 has substantially no holes therein excepting holes for screws and for a spindle 5 of a motor 80.

A pair of reels 62 and a belt 60 are sized to fit adjacently within the lower housing 70. When the lower portion 72 is removably connected to the lower housing 70, both reels 62 rest upon the lower planar extent of the lower portion 72 and the floor of the lower housing 70. The reels 62 have circumferences with teeth, and the belt 60 has corresponding teeth, such that when the reels 62 are connected by way of the belt 60, movement of one of the reels 62 causes the other reel 62 to turn by way of the belt 60. In various embodiments of the disclosed technology, the reels and/or belt may take forms of any pair of cylindrical structures shaped and positioned such that the turning of one causes the turning of the other.

Figure 7:
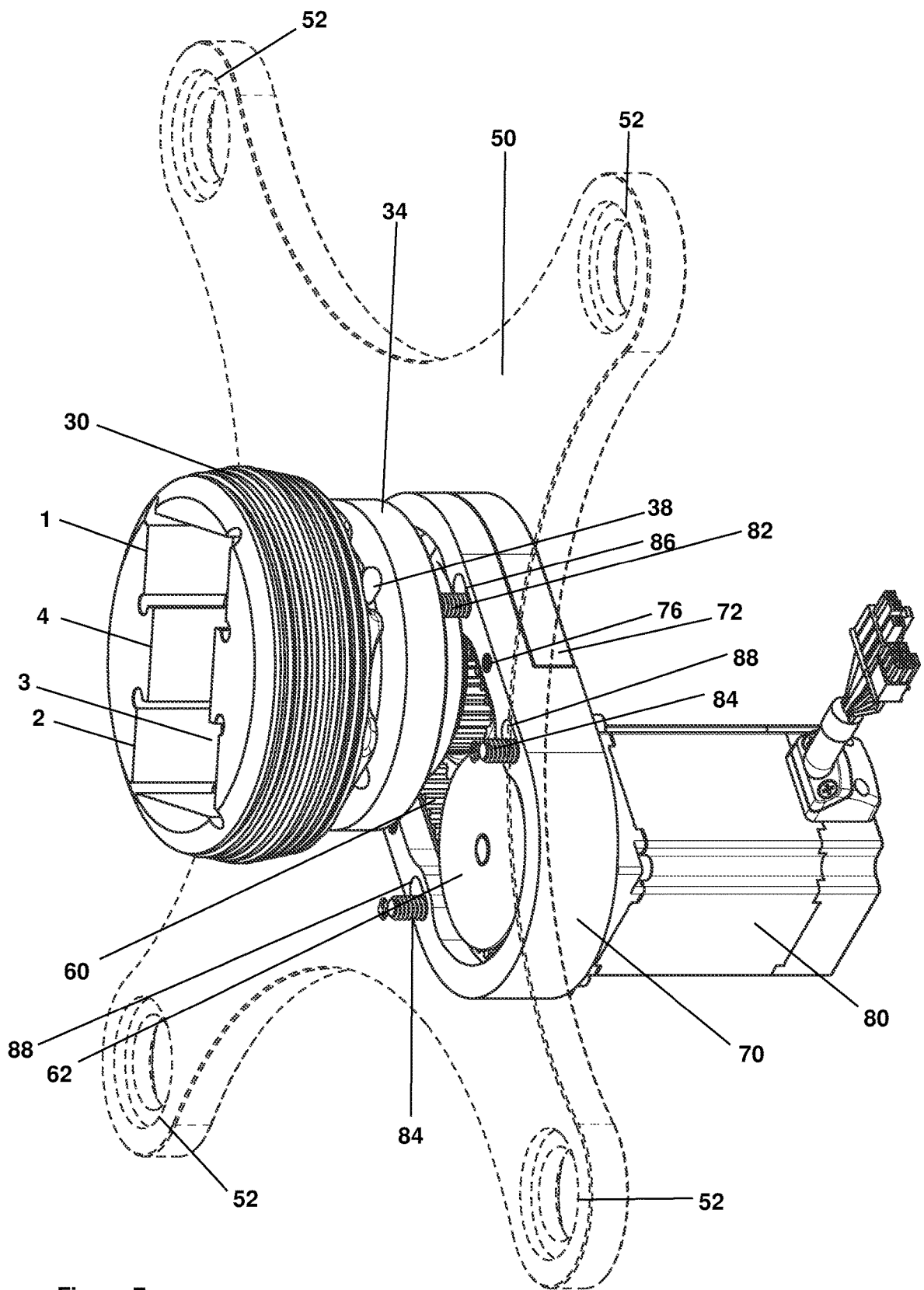
FIG. 7 shows a top and side perspective of a top housing, washers, reels, belt, lower housing, and motor thereof in an embodiment of the disclosed technology.
Figure 8:
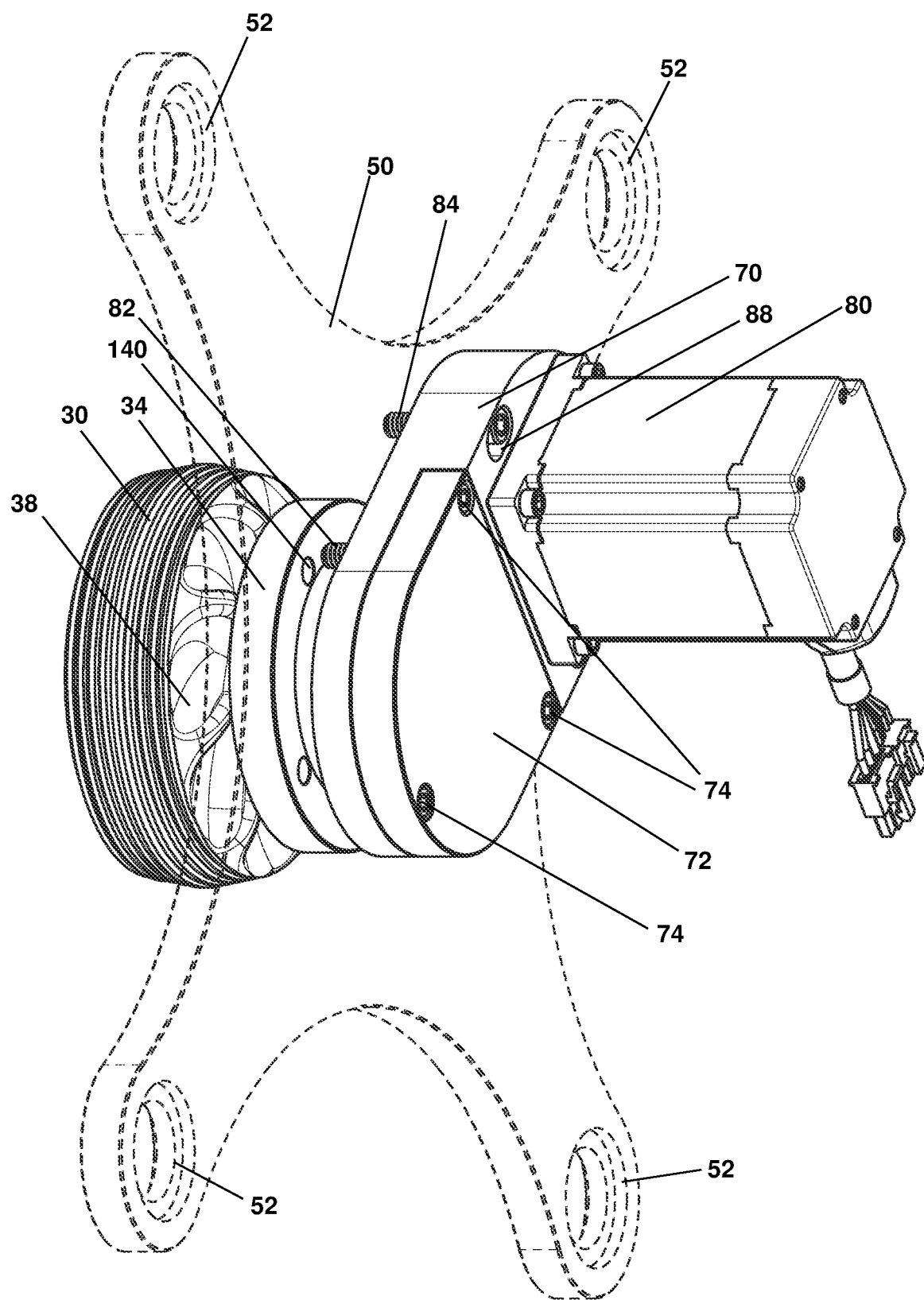
FIG. 8 shows a bottom and side perspective of a top housing, washers, reels, belt, lower housing, and motor thereof in an embodiment of the disclosed technology.

FIG. 7 shows a top and side perspective of a top housing, washers, reels, belt, lower housing, and motor thereof in an embodiment of the disclosed technology. FIG. 8 shows a bottom and side perspective of a top housing, washers, reels, belt, lower housing, and motor thereof in an embodiment of the disclosed technology. The spindle 5 of the motor 80 extends through a portal in the floor of the lower housing 70 and through a central portal 15 of one of the reels 62. In the embodiment shown, the spindle 5 extends through a central portal 15 of a reel 62 which is furthest from a central axis of the central portal 54 of the spacer 50. Thus, turning of the spindle 5 of the motor 80 causes the reel 62 through which it passes, and thus both of the reels 62 and the belt 60, to turn as well. The spindle 5 and the motor 80, in the embodiment shown, are removably held in position with respect to the lower housing 70 and/or the spacer 50 by way of a plurality of screws 82, 84.

The spacer 50 and the upper housing 30 may be attached to the lower housing 70 by way of screws or other removable connectors. In such embodiments, rotation of the spindle 5 of the motor 80 has the following effect: a reel 62 located vertically above the spindle 5 and through which the spindle 5 passes rotates, which causes the belt 60 and thus the second reel 62 to rotate as well. Rotation of the second reel 62 causes both the spindle 6 and the upper housing 30 to rotate as well. At the same time, the lower housing 70, spacer 50, and washer 34 remain substantially stationary. In various embodiments, the washers 32 and 36 may rotate and/or remain stationary, depending on a distance and frictional constant between an inner surface of washer 34 and an outer surface of washers 32 and 36.

Figure 9:
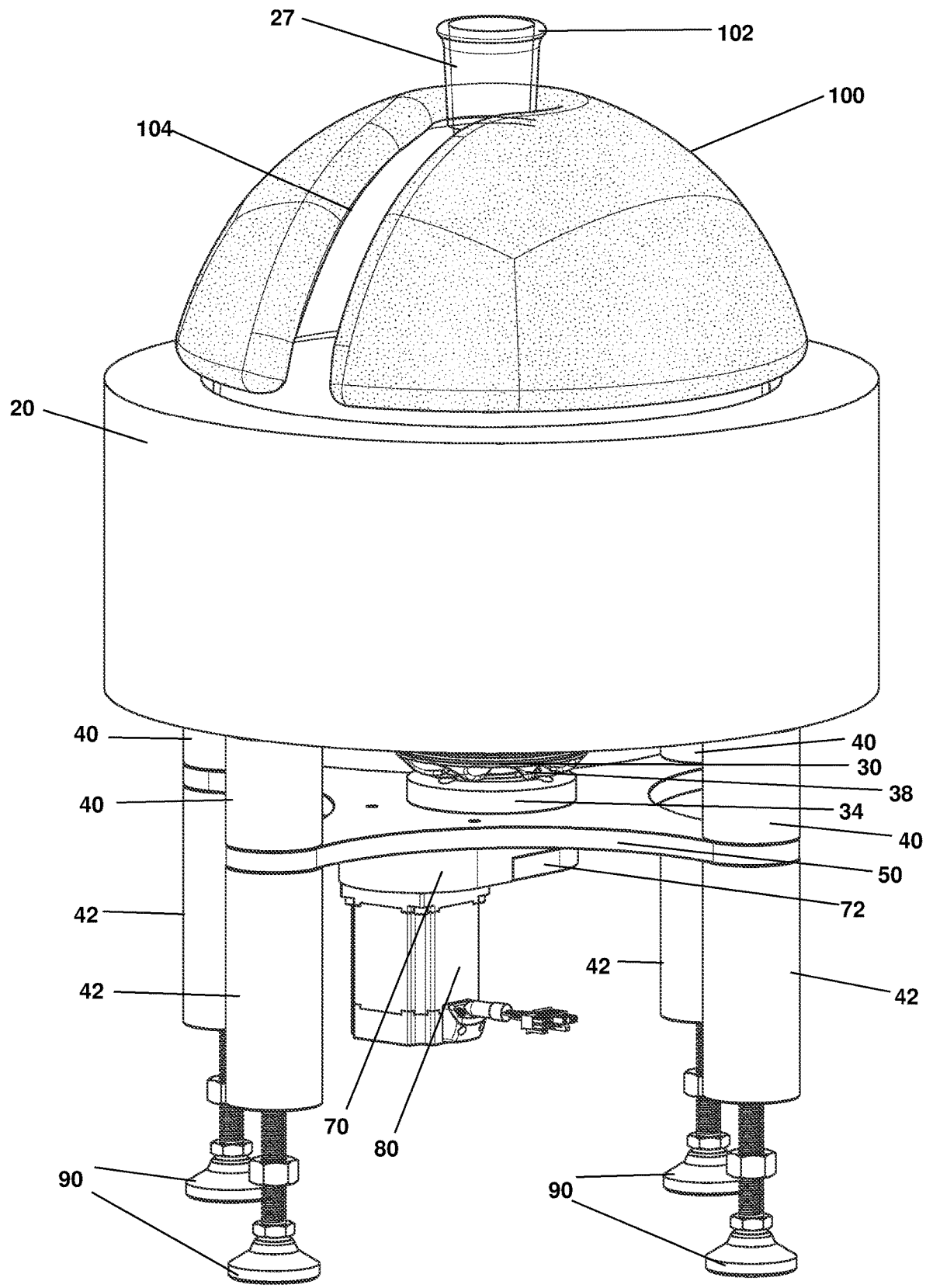
FIG. 9 shows a top and side perspective view thereof.
Figure 10:
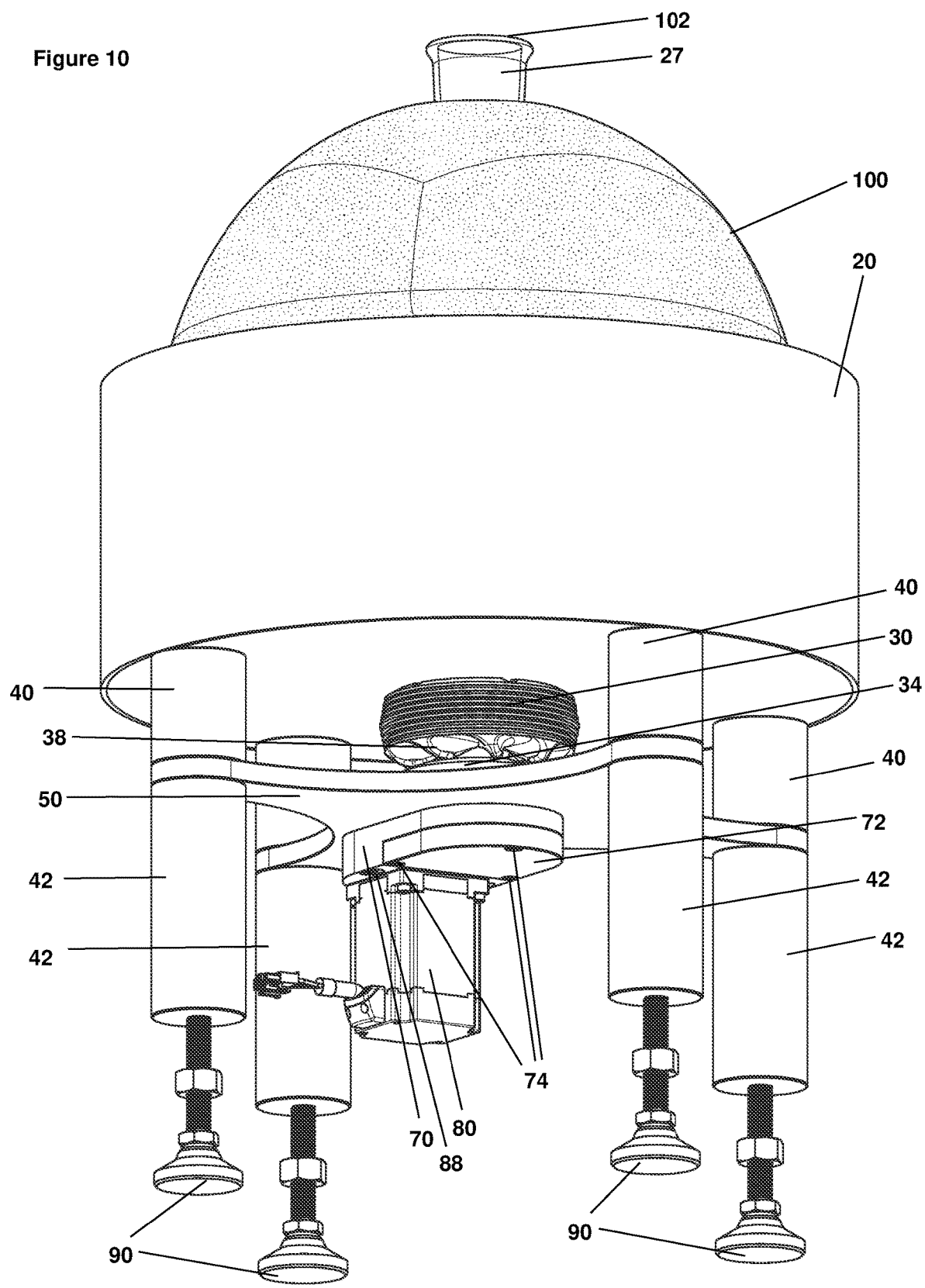
FIG. 10 shows a bottom and side perspective view thereof.

FIG. 9 shows a top and side perspective view thereof. FIG. 10 shows a bottom and side perspective view thereof. In the embodiment shown, a horizontal width of the bowl 20 is a largest width of the device. Furthermore, an axis passing perpendicularly through a central point of a horizontal planar cross-section of the the bowl 20 passes through a substantial center of the upper housing 30; the plate 26 (not shown); a space between the prisms 22, 24 (not shown); the spacer 50; a space between the legs 42 thereof; the flask 27; and a mouth 102 of the flask 27.

A flask cover 100 is removably attachable to the flask 27 in the embodiment shown. The flask cover 100 may be shaped to cover a majority of a portion of the flask 27 which extends above a highest plane of the bowl 20. The flask cover 100 may have an opening 104 to accommodate the mouth 102 of the flask 27. The flask cover 100 may be made of an insulating material, such that when the flask 27 and/or contents thereof is/are heated to a particular temperature range which burns human skin, the flask cover 100 remains at a temperature which does not burn human skin.

Figure 11:
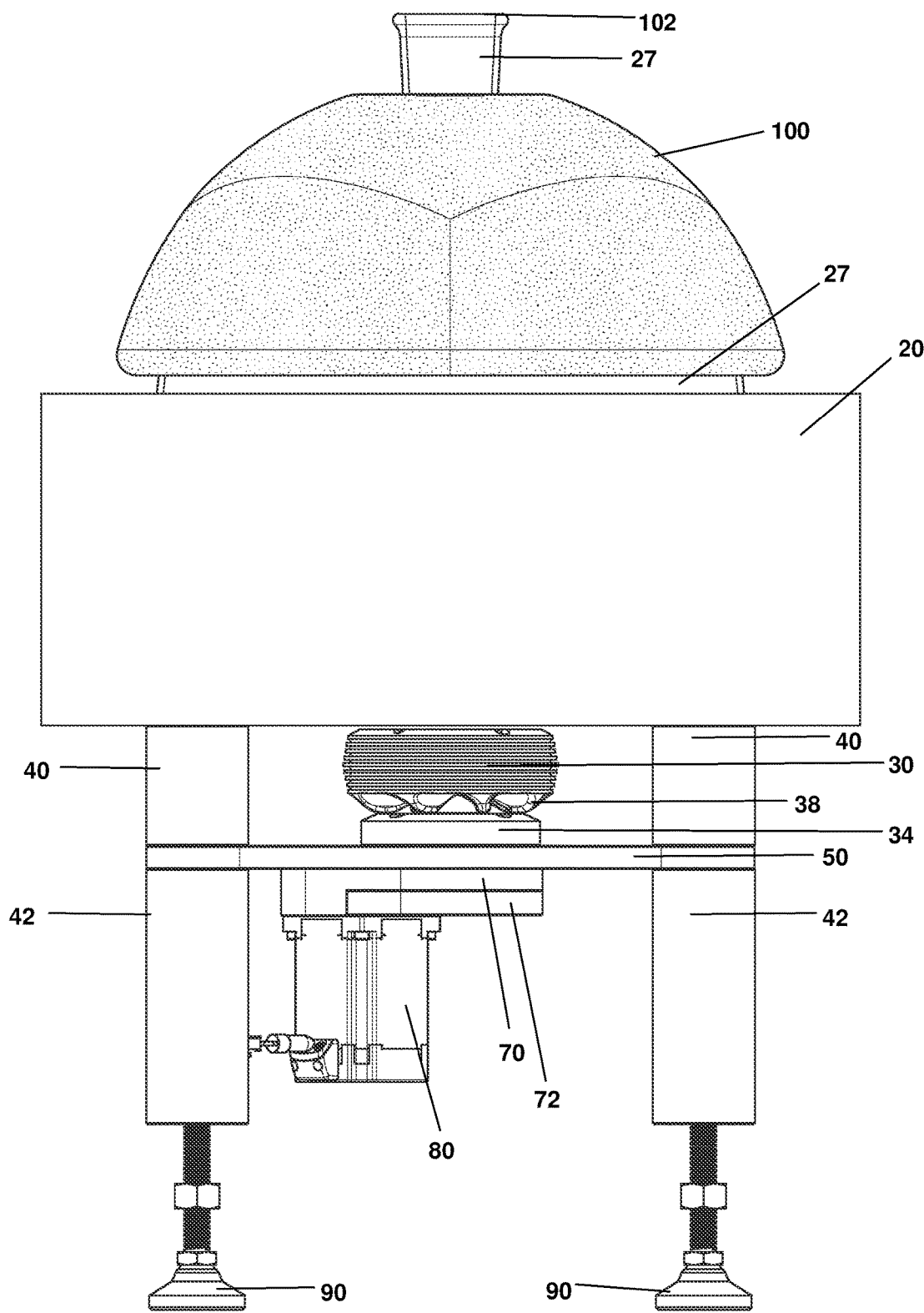
FIG. 11 shows a back elevation view thereof.
Figure 12:
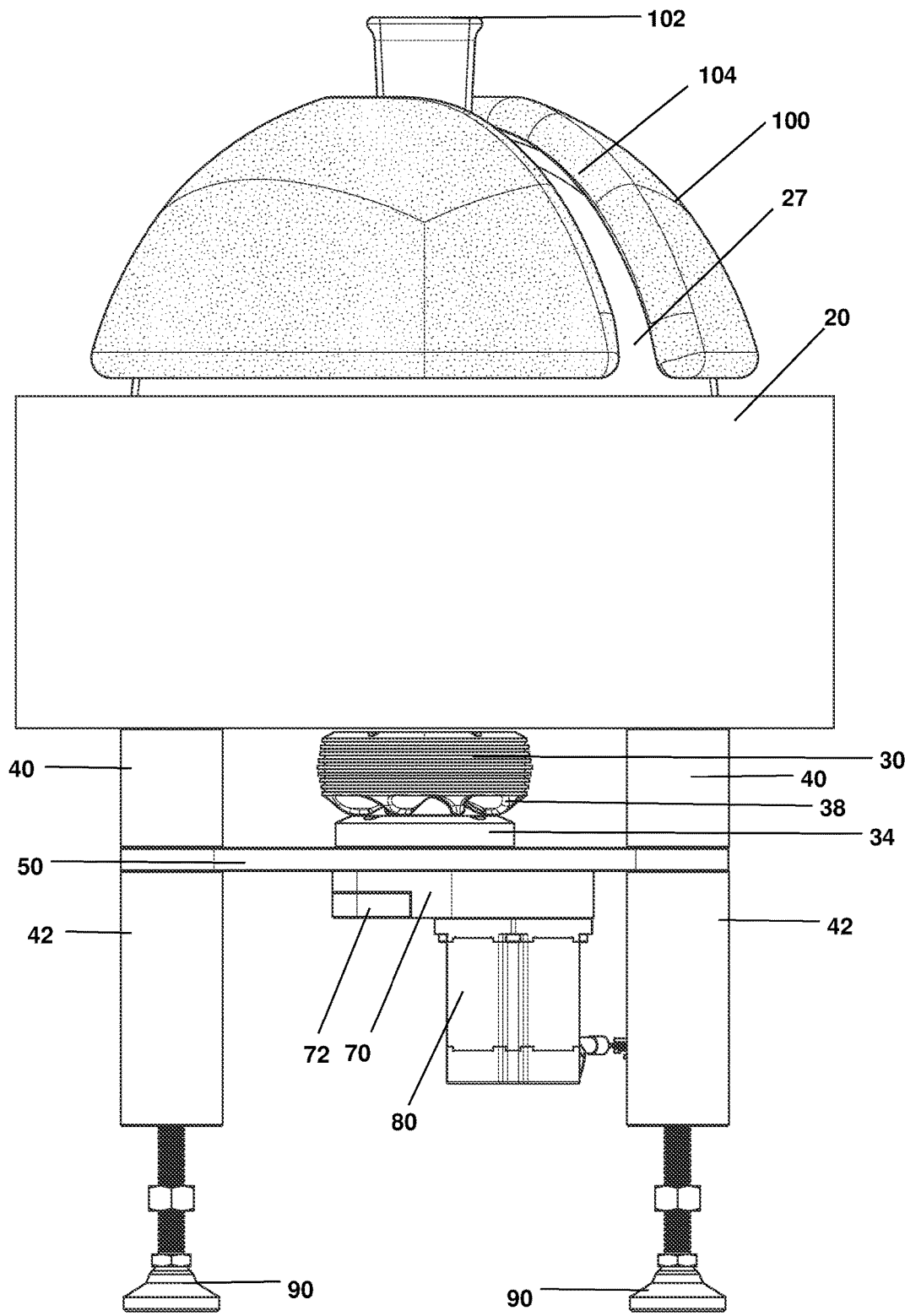
FIG. 12 shows a right side elevation view thereof.
Figure 13:
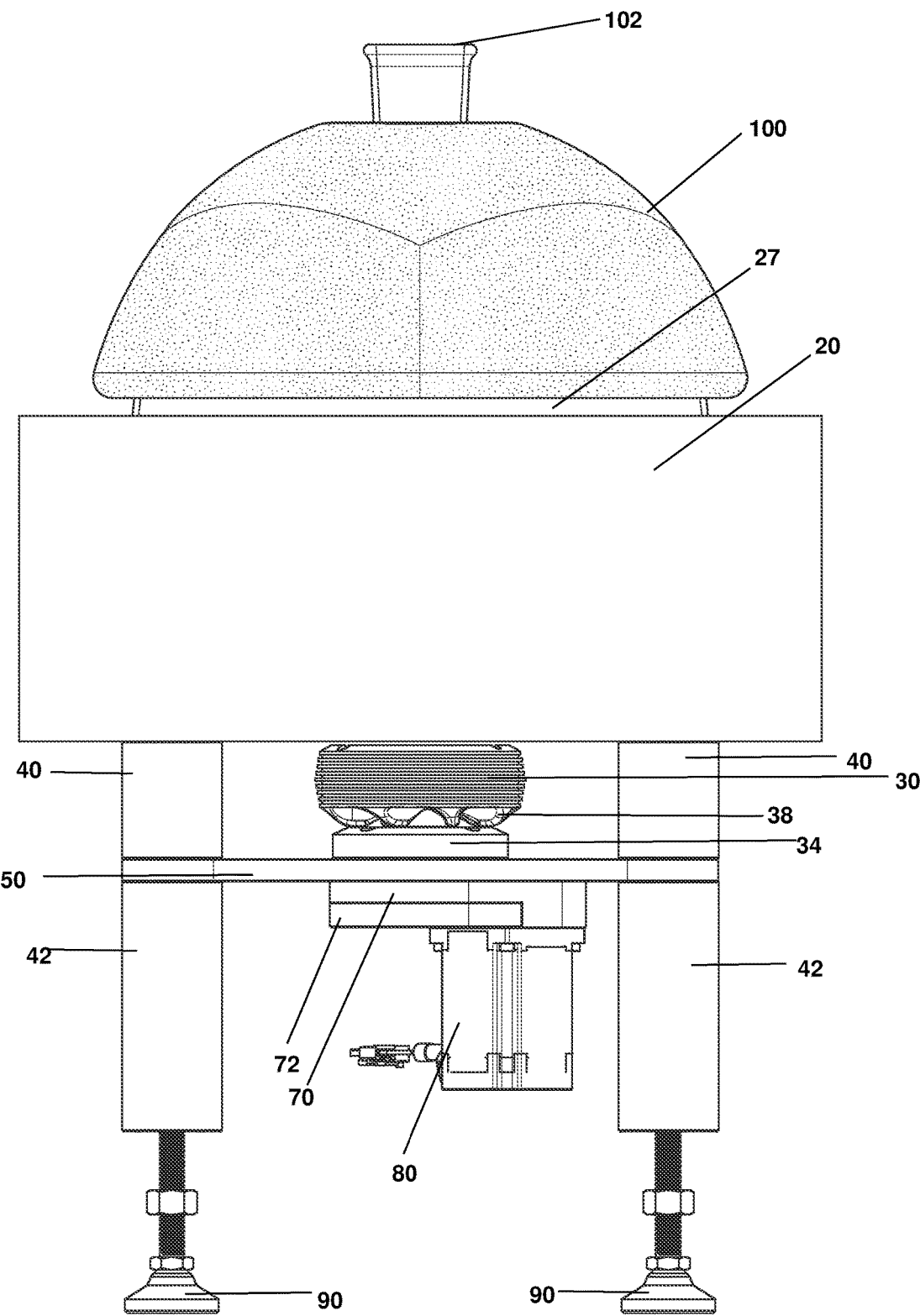
FIG. 13 shows a left side elevation view thereof.
Figure 14:
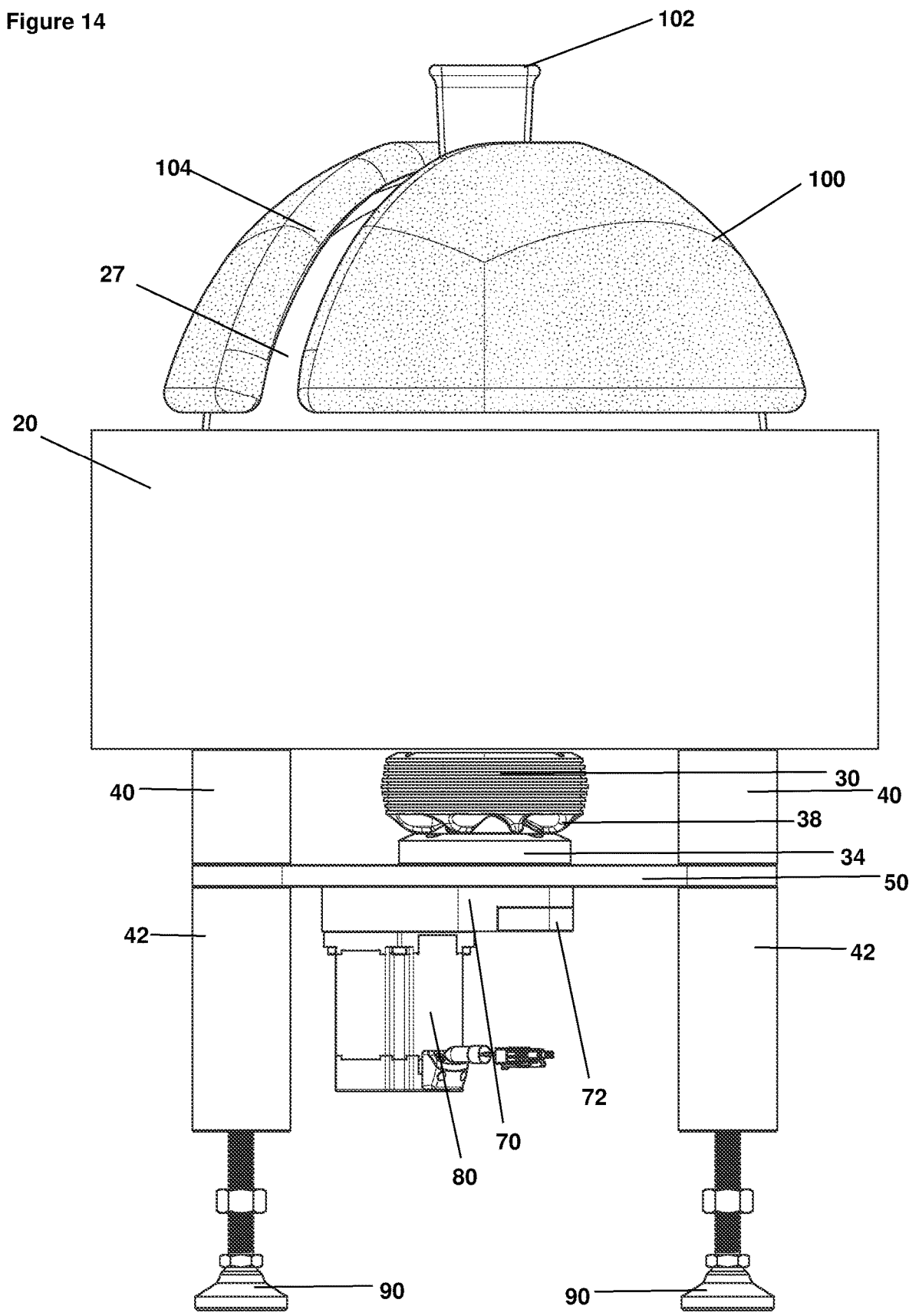
FIG. 14 shows a front elevation view thereof.
Figure 15:
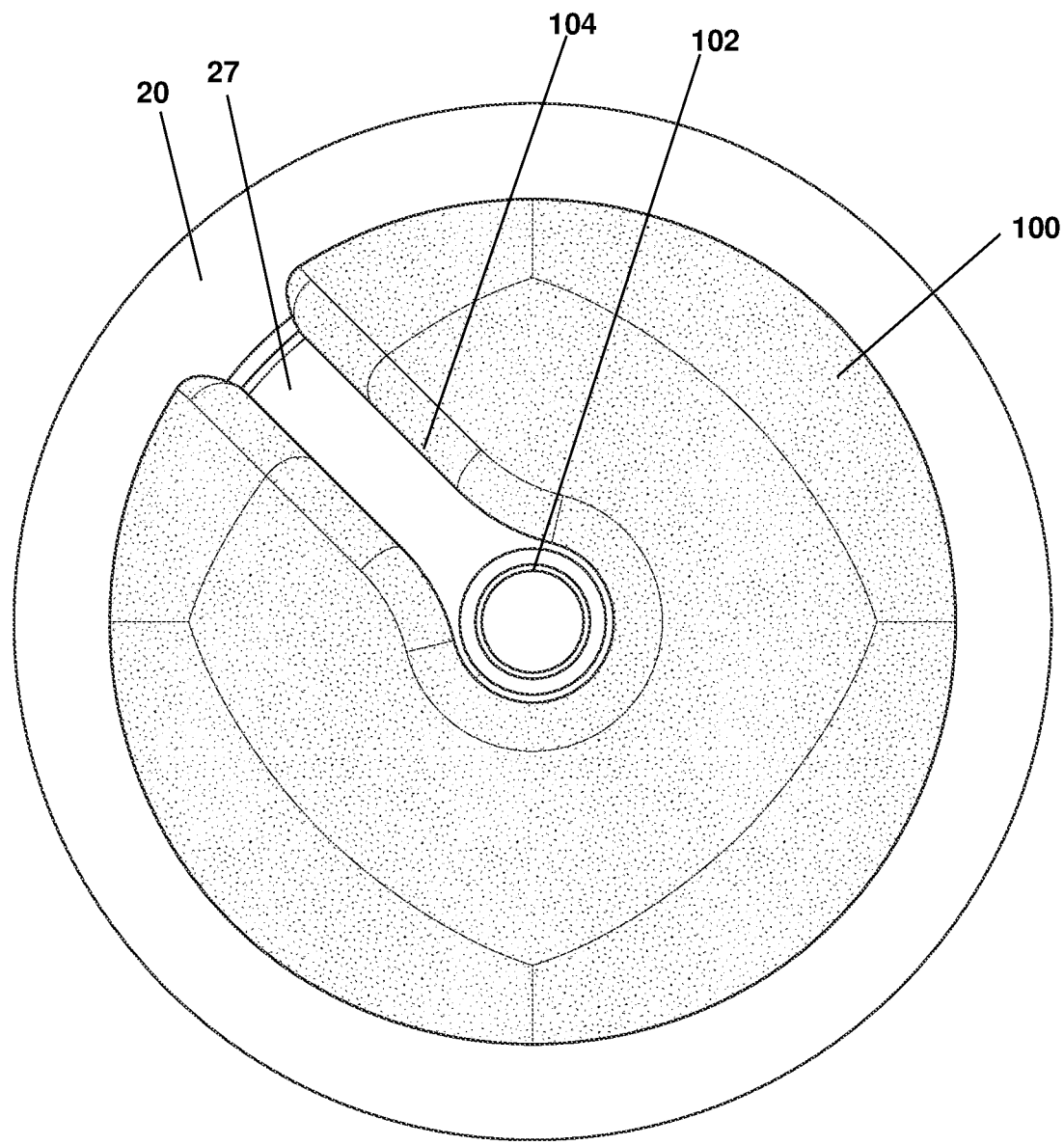
FIG. 15 shows a top plan view thereof.
Figure 16:
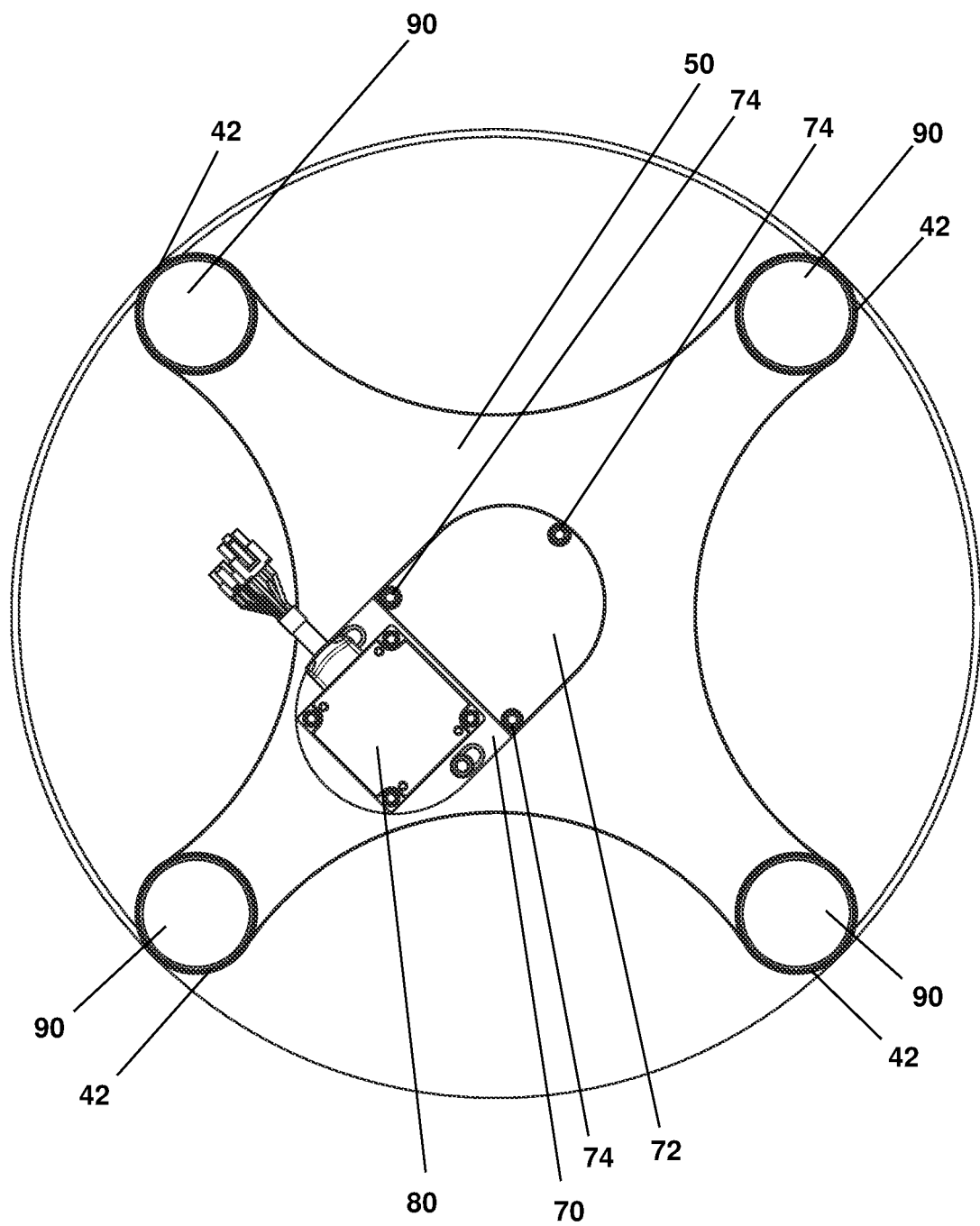
FIG. 16 shows a bottom plan view thereof.
Figure 17:
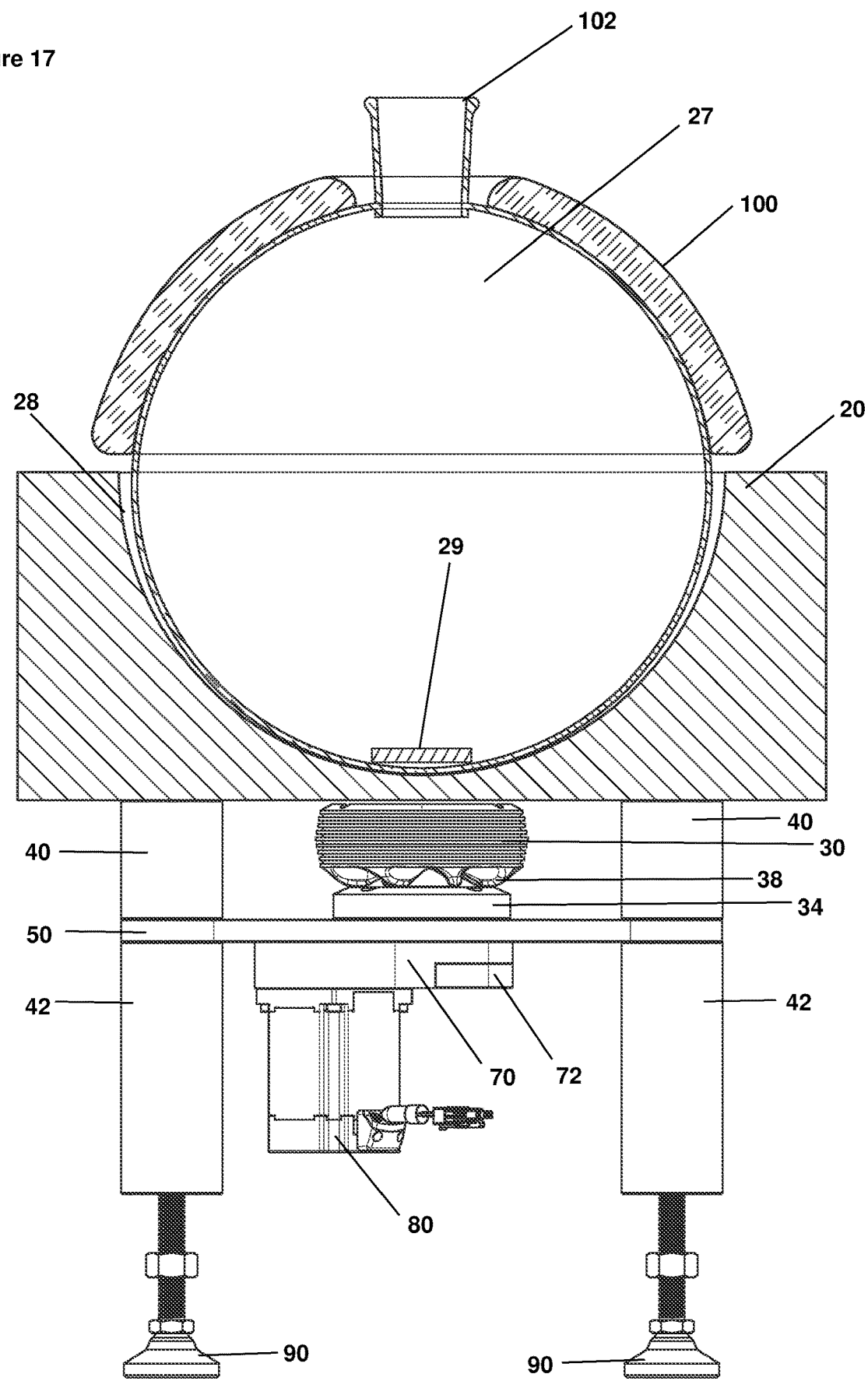
FIG. 17 shows a cutaway front elevation view thereof.

FIG. 11 shows a back elevation view thereof. FIG. 12 shows a right side elevation view thereof. FIG. 13 shows a left side elevation view thereof. FIG. 14 shows a front elevation view thereof. FIG. 15 shows a top plan view thereof. FIG. 16 shows a bottom plan view thereof. FIG. 17 shows a cutaway front elevation view thereof. In various embodiments, a heat source, such as a flame, a fire, or other sources of heat known in the art, is placed at a point vertically below the flask 27 and/or at least a portion of the device. The heat source may be placed vertically above and horizontally offset relative to the motor 80 and/or may be placed at a point between the legs 42. In some embodiments, the heat source may be centered between the legs 42.

In various embodiments, an impeller 29 is located within and/or attached to the flask 27. The impeller 29 is constructed of a ferromagnetic material and/or is a magnet, such that rotation of the magnetic prisms 22, 24 and the plate 26 located within the upper housing 30 causes the impeller 29 to rotate commensurately. The impeller 29 is sufficiently fixed to the flask 27 that rotation thereof, caused by rotation of the magnetic prisms 22, 24 and the plate 26 located within the upper housing 30, causes the flask 27 to rotate commensurately, thus stirring contents thereof.

In embodiments, when the heat source is placed below the flask 27 and the spindle 5 of the motor 80 is rotating, heat from the heat source extends upward toward the bowl 20 and/or the flask 27 and/or contents thereof. The heat from the heat source may be of sufficient quantities to alter a temperature of the bowl 20 and/or of the flask 27 and/or of contents thereof. A combination of heating by the heat source and stirring by way of the impeller 29 thus causes contents of the flask 27 to be evenly heated. The heat from the heat source is also pushed downward by rotation of the fan blades 38, caused by rotation of the upper housing 30. The fan blades dissipate heat above the spacer 50 such that the heat has turbulent flow outwards and up towards the entire base of the bowl 20, making for even heating at the bottom side of the bowl 20. This combination causes a more even heating of the bowl 20 and/or the flask 27 and/or contents thereof.

Figure 18:
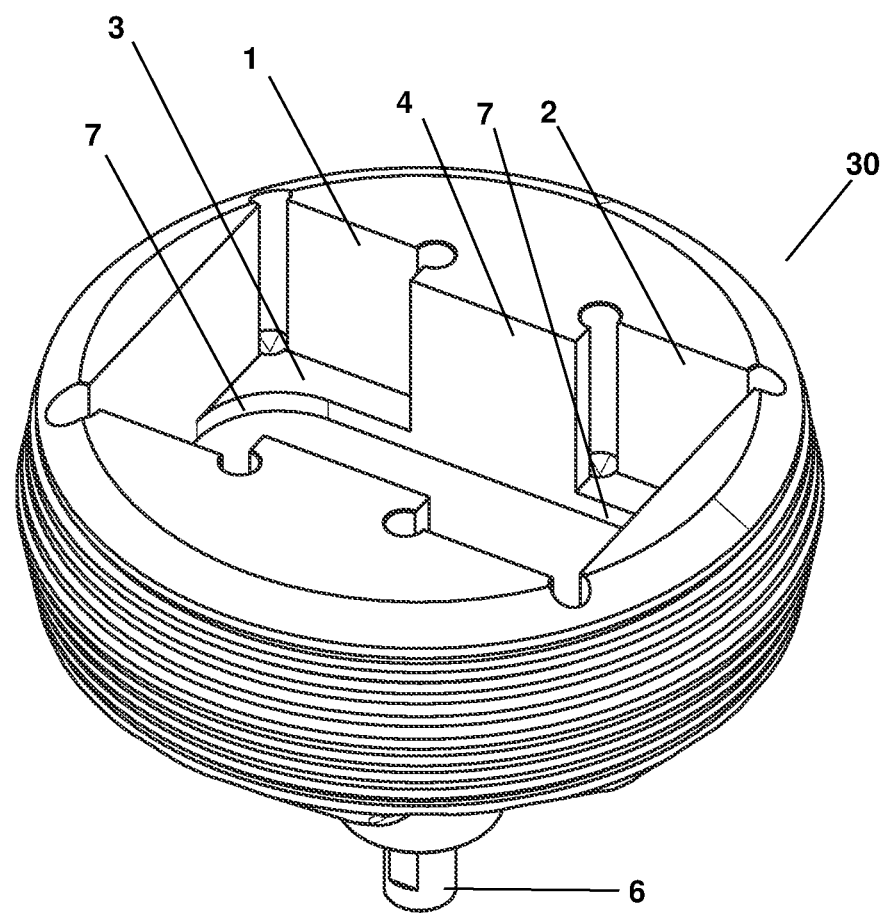
FIG. 18 shows a top and side exploded perspective view of a top housing and washer thereof.
Figure 18:
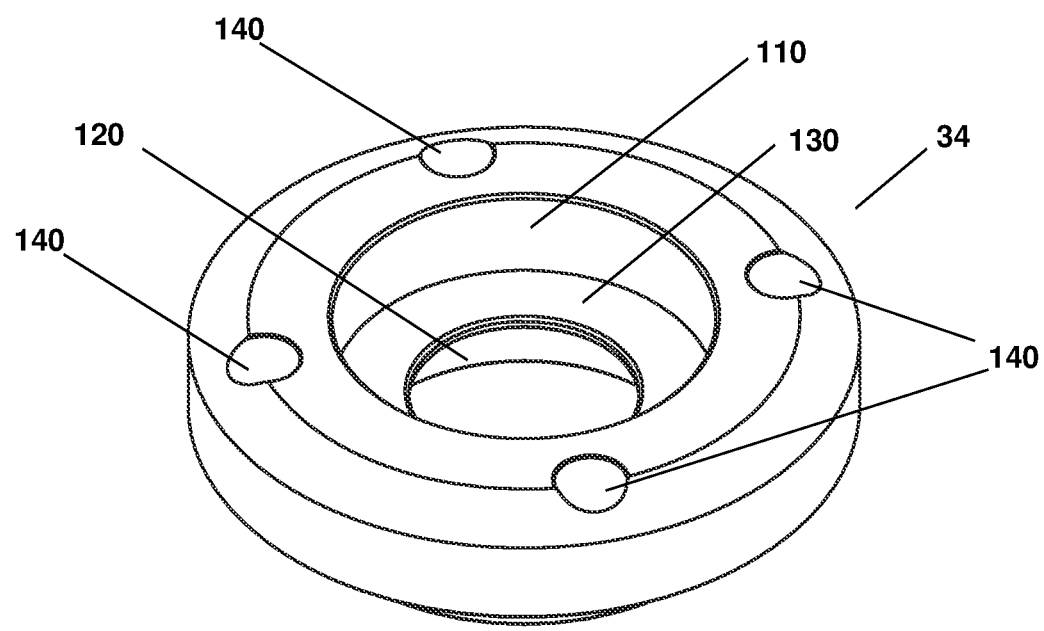
Figure 19:
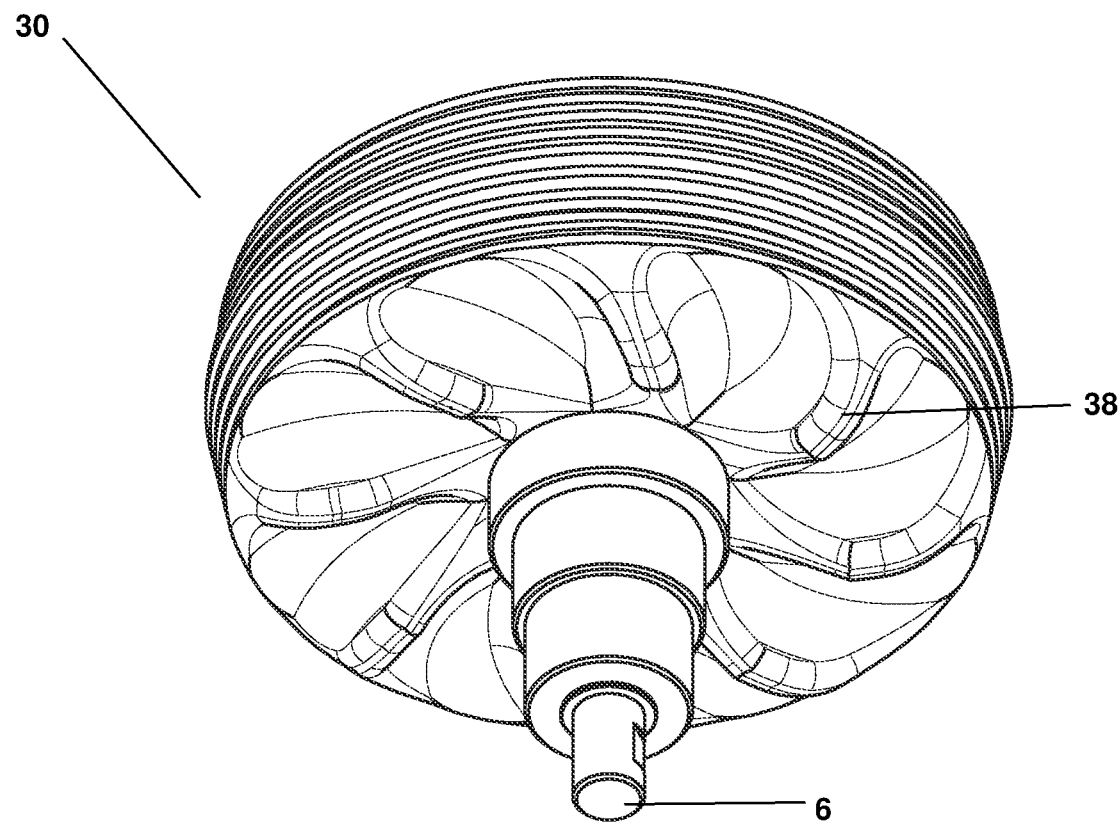
FIG. 19 shows a bottom and side exploded perspective view of a top housing and washer thereof.
Figure 19:
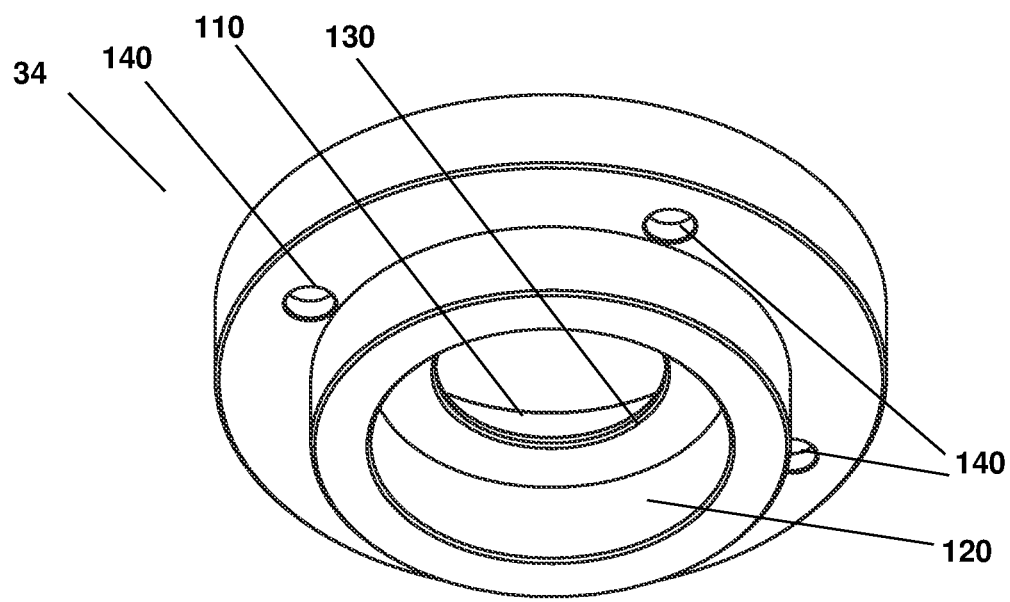
Figure 20:
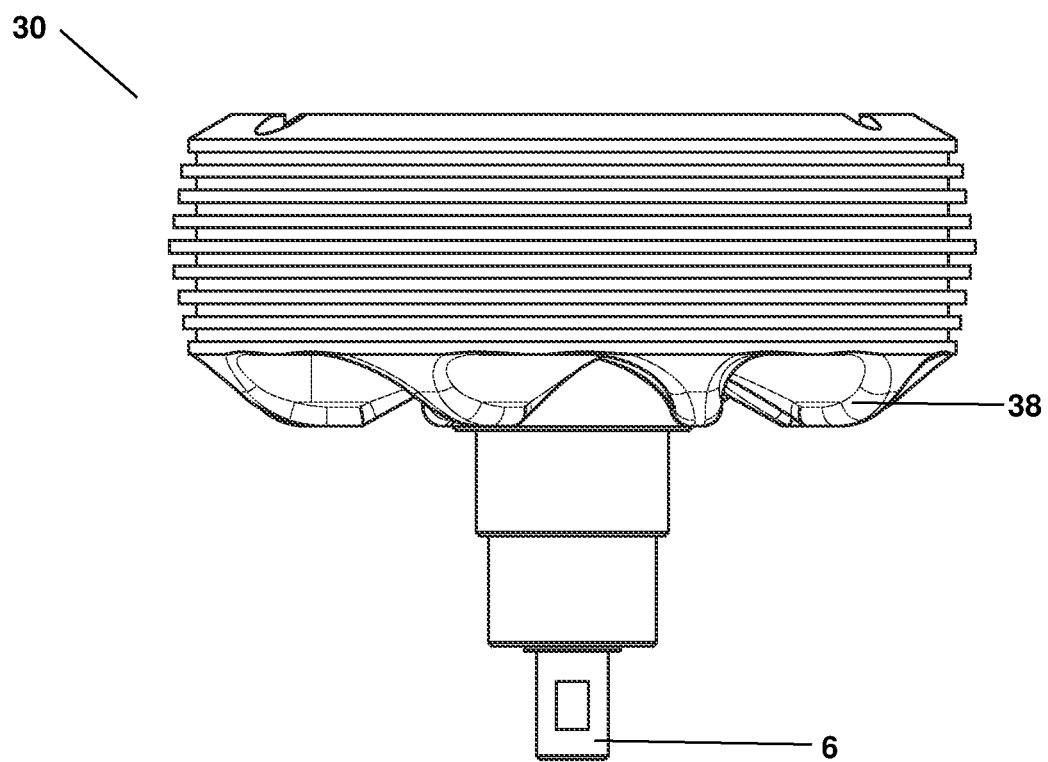
FIG. 20 shows a front elevation view of a top housing and washer thereof.
Figure 20:
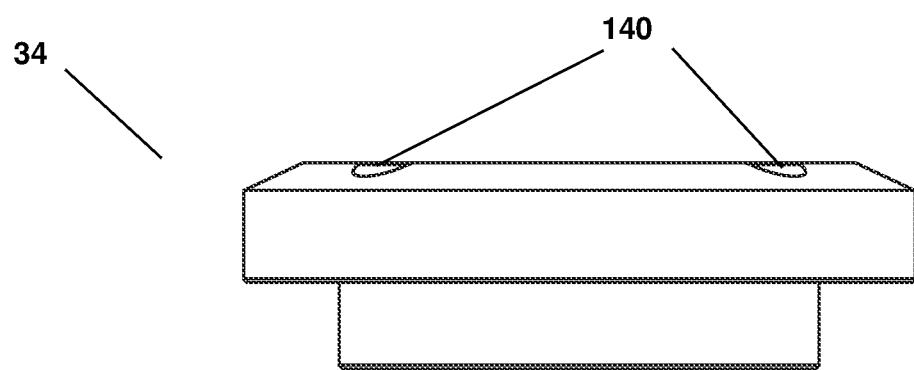
Figure 21:
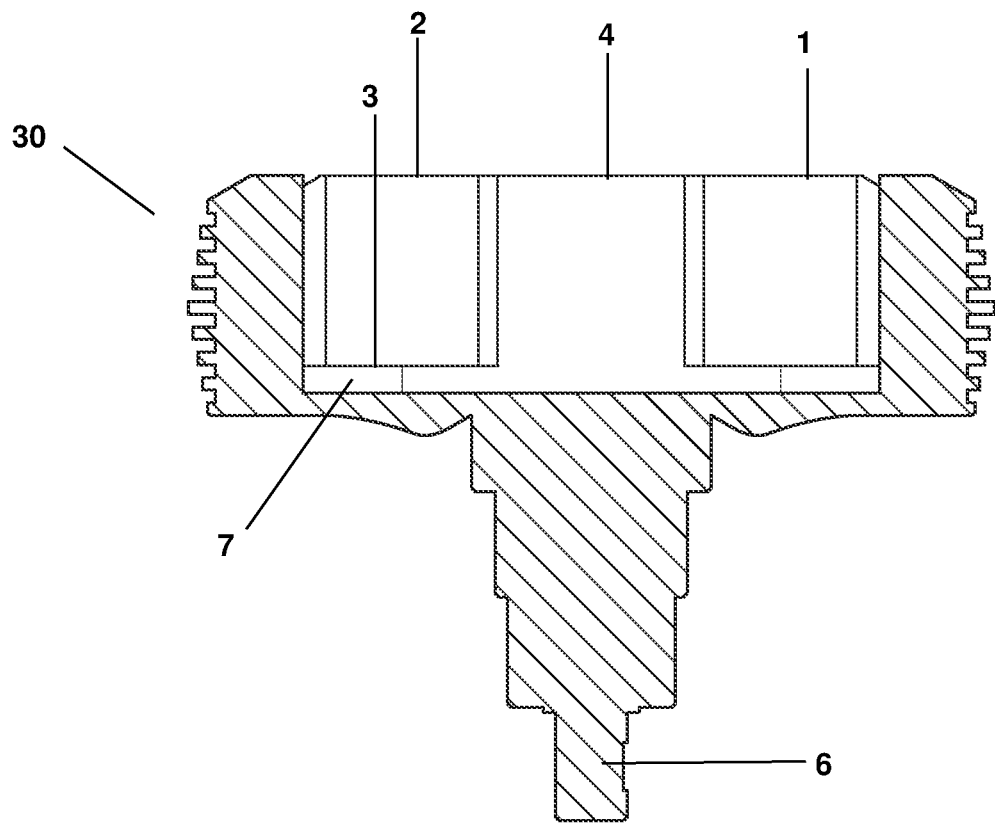
FIG. 21 shows a cutaway front elevation view of a top housing and washer thereof.
Figure 22:
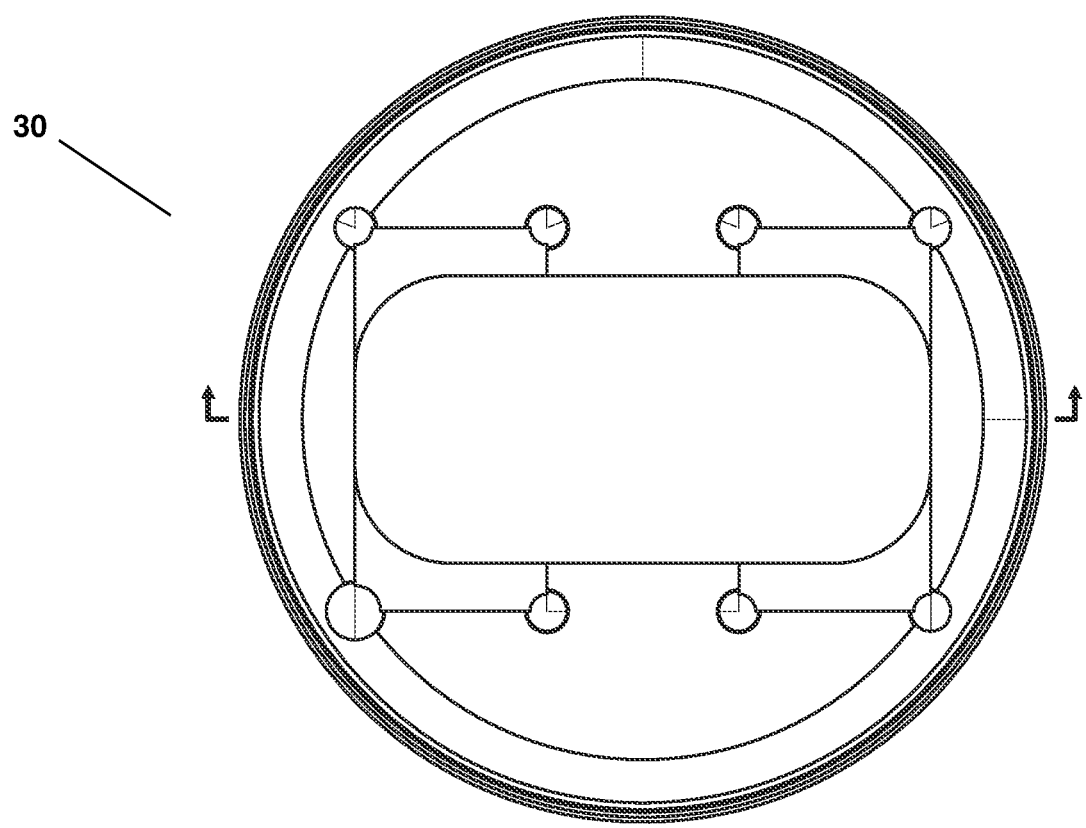
FIG. 22 shows a top plan view of a top housing and washer thereof.
Figure 22:
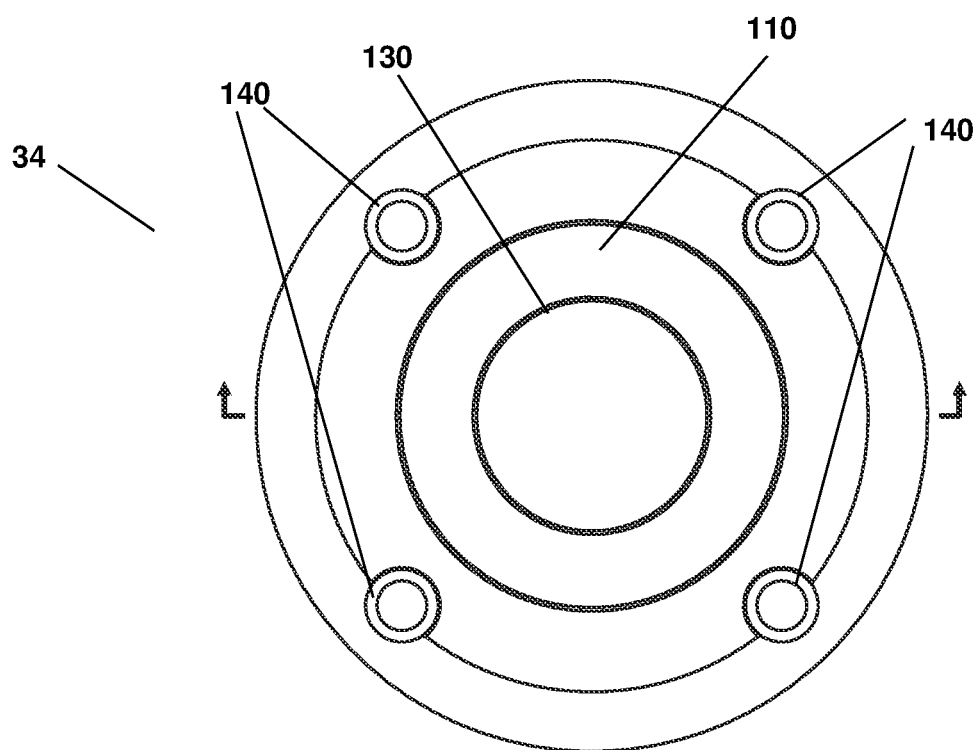
Figure 23:
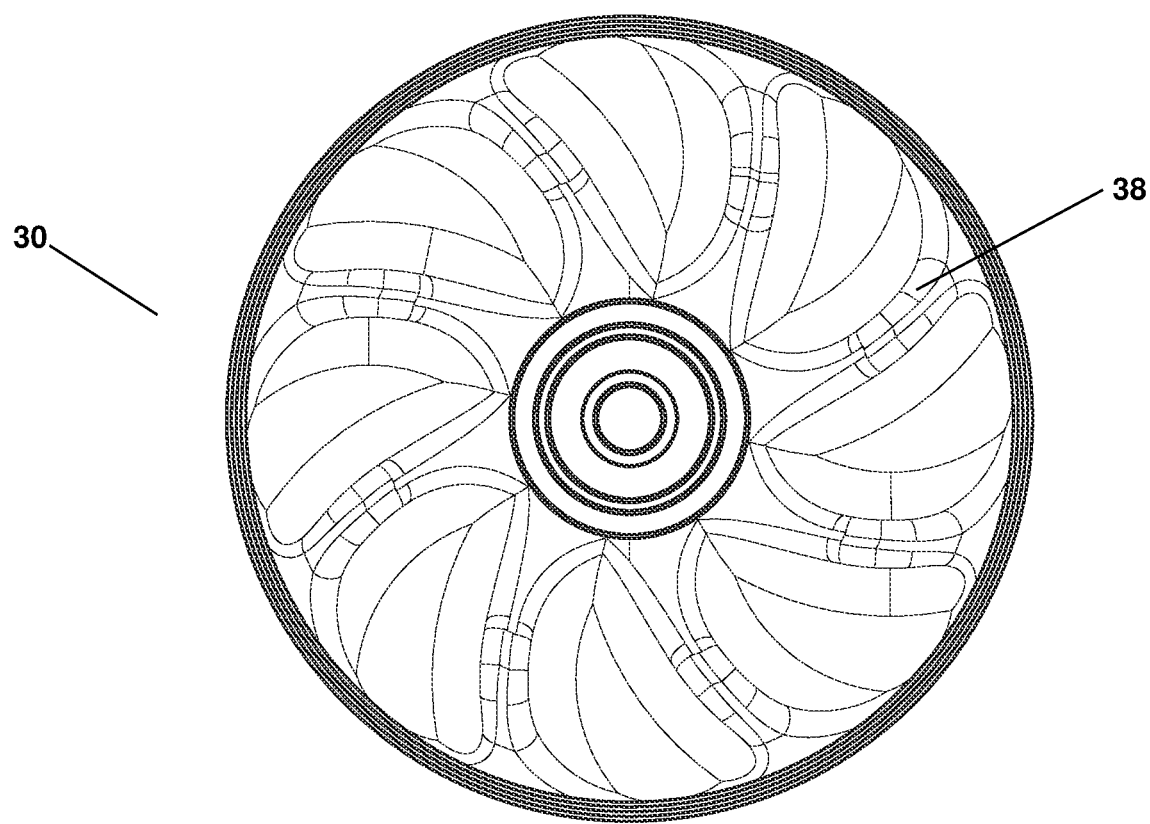
FIG. 23 shows a bottom plan view of a top housing and washer thereof.
Figure 23:
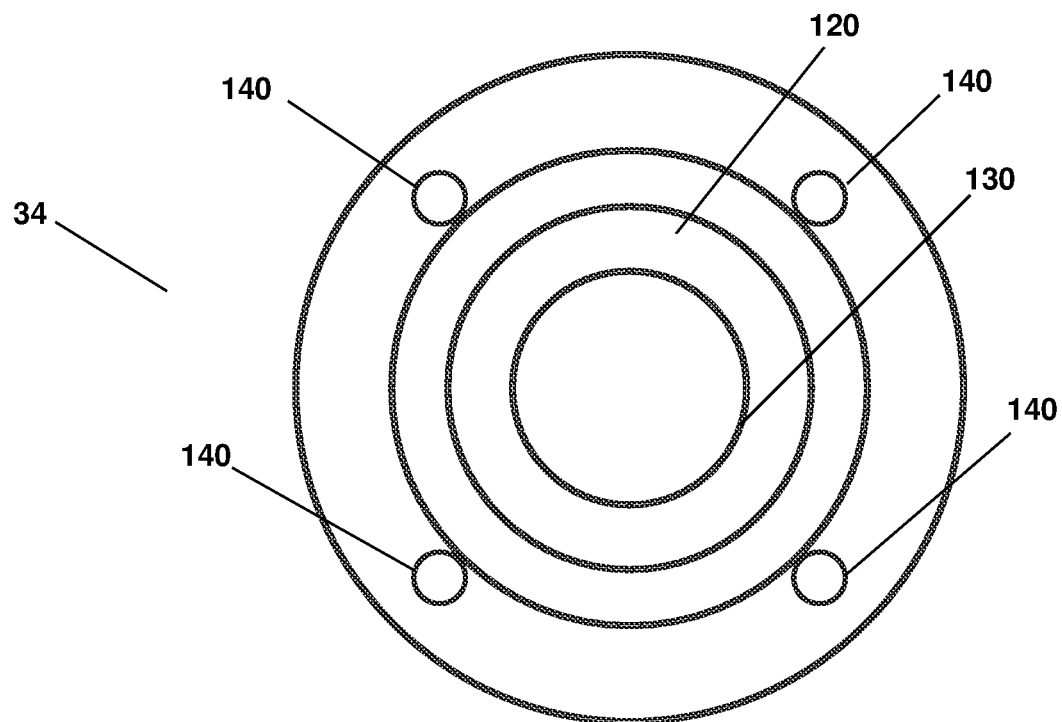

FIG. 18 shows a top and side exploded perspective view of a top housing and washer thereof. FIG. 19 shows a bottom and side exploded perspective view of a top housing and washer thereof. FIG. 20 shows a front elevation view of a top housing and washer thereof. FIG. 21 shows a cutaway front elevation view of a top housing and washer thereof. FIG. 22 shows a top plan view of a top housing and washer thereof. FIG. 23 shows a bottom plan view of a top housing and washer thereof.

The upper housing 30 is circular, in embodiments of the disclosed technology, so that it can rotate evenly. The centrifugal force caused by its rotation causes the magnetic prisms 22, 24 to be forced towards outer edges of the upper housing 30. The magnets 22, 24 (not shown) fit into each of the wider regions 1 and 2 respectively. The narrower region 4 has flanges extending towards each other, as shown, which prevents the magnets 22, 24 in cavities 1 and 2 from moving towards each other.

The lip 3 is sized to fit a plate such as a metal and/or magnetizable plate 26 (not shown) having low heat capacity (such as 1000 Joules per kilogram degree Celsius).

The spindle 6 of the upper housing 30 can have a plurality of descending sections of varying circumferences which are each sized to fit in a washer, such as washers 32, 34, and 36, while the end of the spindle is rotatably connected within one of the reels 62. A separation is thus maintained between a lowermost part of the plurality of fan blades 38 attached to the upper housing 30 and between an uppermost edge of any washer 32, 34, 36, allowing the fan blades 38 to rotate substantially without resistance.

The washer 34 has interior receptacles 110, 120 to accommodate washers 32 and 36, respectively. The receptacles 110, 120 are separated by a lip 130. Washer 32 and/or washer 36 may extend from the lip 130 to a point beyond, respectively, an uppermost and/or a lowermost horizontal plane of the washer 34.

In the embodiment shown, washer 34 has four holes 140 into which a component, such as a screw, may be removably inserted. The washer 34 is thus held substantially stationary relative to the upper housing 30, which is free to rotate. The holes 140 may be threaded. In embodiments, the washer 34 may be held substantially stationary with respect to rotation by being attached to any other substantially relatively stationary component of the device, by any form of removable attachment.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalence of the claims are to be embraced within their scope. Combinations of any of the methods, systems, and devices described herein-above are also contemplated and within the scope of the disclosed technology.

For purposes of this disclosure, the term "substantially" is defined as "at least 95% of" the term which it modifies.

Any device or aspect of the technology can "comprise" or "consist of" the item it modifies, whether explicitly written as such or otherwise.

When the term "or" is used, it creates a group which has within either term being connected by the conjunction as well as both terms being connected by the conjunction.

While the disclosed technology has been disclosed with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the invention.

The invention claimed is:

1. An impeller system, comprising:
  a first housing comprising a lower spindle;
  a portal within said first housing having a narrower middle section between two wider sections and a lower indented section within a raised border; and
  a second housing with a removably attached lower portion;
  wherein a planar section of said removably attached lower portion of said second housing has a thickness substantially equal to a thickness of a functionally connected floor of said second housing;
  wherein said lower portion of said second housing, when removably connected to said second housing, substantially abuts a sidewall of said second housing and said floor of said second housing such that a space in a plane of said functionally connected floor of said second housing which is circumscribed by an edge of said floor and said sidewall of said second housing is substantially filled;

wherein a part of a leg passes through each of four portals of a spacer located between said first housing and said second housing, each said leg elongated in a vertical direction;

wherein four caps abut an upper side of said spacer and hold a respective leg of said four legs to a lower side of said spacer; and wherein each respective cap has a respective spindle extending upwardly there-from.

2. The impeller system of claim 1, wherein said lower spindle extends from under said narrower middle section.

3. The impeller system of claim 2, further comprising: a first reel and a second reel rotatably connected to each other by way of a belt; and wherein said reel is rotatably attached to a spindle of a motor, such that rotation of said spindle of said motor causes said first housing to rotate by way of said second reel, said belt, and said first reel.

4. The impeller system of claim 3, wherein said second housing is abutted against said spacer; and wherein said first housing is abutted against said spacer and is disposed on an opposite side relative to said second housing.

5. The impeller system of claim 4, wherein said spacer is connected to said second housing such that said spacer and said second housing are removably connected to each other and remain in place relative to one another when said first housing, which passes through said spacer, is rotating.

6. The impeller system of claim 5, wherein said spacer comprises a central portal through which said spindle of said first housing extends and four portals equi-spaced from said central portal;

wherein a distance from a central point of said central portal to a central point of a portal of said four portals is substantially greater than a longest horizontal extent of said second housing.

7. The impeller system of claim 6, wherein said second housing further comprises a top side with a lip, said lip forming a unitary structure with a floor having a first portal therein;

wherein said spindle of said motor is substantially centered with respect to said portal of said floor of said second housing.

8. The impeller system of claim 7, wherein said lip further surrounds a second portal larger than said first portal.

9. An impeller system, comprising:
a first housing comprising a lower spindle;
a portal within said first housing having a narrower middle section between two wider sections and a lower indented section within a raised border; and
a second housing with a removably attached lower portion;

wherein a planar section of said removably attached lower portion of said second housing has a thickness substantially equal to a thickness of a functionally connected floor of said second housing;

wherein said lower portion of said second housing, when removably connected to said second housing, substantially abuts a sidewall of said second housing and said floor of said second housing such that a space in a plane of said functionally connected floor of said second housing which is circumscribed by an edge of said floor and said sidewall of said second housing is substantially filled;

wherein a bowl is centered above said first housing;

wherein said first housing is centered above a first reel;

wherein when said first reel is placed within said second housing and said lower portion of said second housing is removably connected to said second housing, said first reel is located vertically above a planar extent of said lower portion;

wherein when said first reel is placed within said second housing and said lower portion of said second housing is removably connected to said second housing, a second reel is located vertically above a planer extent of said floor of said second housing;

wherein a spindle of a motor is substantially centered below said second reel wherein a part of a leg passes through each of four portals of a spacer located between said first housing and said second housing, each said leg elongated in a vertical direction;

wherein four caps abut an upper side of said spacer and hold a respective leg of said four legs to a lower side of said spacer; and wherein each respective cap has a respective spindle extending upwardly there-from.

10. The impeller system of claim 9, wherein each said spindle of said caps is threaded;

wherein each said threaded spindle is removably screwable into a respective hole on a lower side of said bowl.

11. The impeller system of claim 10, further comprising:
a plate surrounded, at least in part, by said lower indented section; and
two magnets separately abutted against said plate;

wherein said plate is centered with regard to said first reel and is vertically above said lower portion of said second housing.

12. The impeller system of claim 11, further comprising:

wherein said two magnets are two rectangular prism shaped magnets, each within one of said two wider sections;

wherein said two wider sections of said first housing are a rectangle with a portal opening formed between flanges of said narrower middle section;

wherein each of said two rectangular prisms is abutted against said plate;

wherein an arc corresponding to a circumference of said first reel passes through both said wider section of said first housing.

13. The impeller system of claim 12, wherein each of said two rectangular prisms has a side corresponding to a northern pole of a magnetic field thereof facing upwards towards said bowl and a side corresponding to a southern pole of a magnetic field thereof facing in an opposite downward direction towards said second housing and said lower portion thereof; or wherein each of said two rectangular prisms has a side corresponding to a southern pole of a magnetic field thereof facing upwards towards said bowl and a side corresponding to a northern pole of a magnetic field thereof facing in an opposite downward direction towards said second housing and said lower portion thereof;

wherein said plate is magnetized by said two rectangular prism shaped magnets.

14. The impeller system of claim 13, wherein:
said motor is off-center with respect to said bowl;
said first housing is centered with respect to said bowl; and
said lower portion of said second housing is centered with respect to said first housing.

15. The impeller system of claim 14, wherein said first housing comprises fan blades closed to a top side of said first housing and open to a bottom side of said first housing;
wherein a diameter of said fan blades is greater than a width of said lower portion of said second housing;
wherein said width is in a direction perpendicular to a longest extent of said second housing.

16. The impeller system of claim 15, wherein said system is adapted for placement of a heat source between said four legs;
wherein said heat source is placed vertically above and horizontally offset relative to said motor;
wherein said heat source is placed vertically below said lower portion of said second housing;
wherein said heat source is substantially centered between said legs;
wherein heat extending upwards from said heat source extends towards said fan blades and is pushed downwards by said fan blades, causing a more even heating of said bowl while said two rectangular prism shaped magnets rotate with said fan blades.

17. The impeller system of claim 16, further comprising:
a flask cover adapted to cover a majority of a portion of said flask extending past an upper edge of said bowl;
wherein said flask cover is constructed of an insulating material.

* * * * *